(12) United States Patent
Plache et al.

(10) Patent No.: US 8,732,658 B2
(45) Date of Patent: *May 20, 2014

(54) LAYERED INTERFACE IN AN INDUSTRIAL ENVIRONMENT

(75) Inventors: Kenneth Plache, Scottsdale, AZ (US); Daniel B. Seger, III, Kennesaw, GA (US); Raymond Staron, Chagrin Falls, OH (US); Robert J. Kretschmann, Bay Village, OH (US); Taryl Jasper, South Euclid, OH (US); James Harry Jarrett, Baltimore, MD (US); Russell Brandes, Brunswick, OH (US); Ronald Bliss, Twinsburg, OH (US); Michael Kalan, Highland Heights, OH (US); Subbian Govindaraj, Solon, OH (US); Kenwood Hall, Hudson, OH (US); Douglas J. Reichard, Fairview, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 696 days.

This patent is subject to a terminal disclaimer.

(21) Appl. No.: 12/893,804

(22) Filed: Sep. 29, 2010

(65) Prior Publication Data

US 2011/0022198 A1 Jan. 27, 2011

Related U.S. Application Data

(63) Continuation-in-part of application No. 11/536,715, filed on Sep. 29, 2006, now Pat. No. 7,856,279, and a continuation-in-part of application No. 11/536,746, (Continued)

(51) Int. Cl.
*G06F 9/44* (2006.01)

(52) U.S. Cl.
USPC ............ 717/107; 717/106; 717/113; 707/758

(58) Field of Classification Search
USPC .......................... 717/100–119; 707/758–775; 709/220–231
See application file for complete search history.

(56) References Cited

U.S. PATENT DOCUMENTS

| 5,485,620 A | 1/1996 | Sadre et al. |
| 5,522,066 A | 5/1996 | Lu |

(Continued)

FOREIGN PATENT DOCUMENTS

| CN | 101201598 A | 6/2008 |
| CN | 101201599 A | 6/2008 |

(Continued)

OTHER PUBLICATIONS

OA dated Mar. 22, 2011 for U.S. Appl. No. 12/241,319, 23 pages.

(Continued)

*Primary Examiner* — Satish Rampuria
(74) *Attorney, Agent, or Firm* — Turocy & Watson, LLP

(57) ABSTRACT

System(s) and method(s) are provided for implementing a set of interface components across a set of layers of an industrial environment, and for managing at least one interface component or at least one layer of the industrial environment. To implement an interface component in at least one layer in the set of layers, a specification that defines the interface component is acquired and, based at least on the specification, a service is generated. Execution of the service implements the interface component. The managing includes deploying or discovering the at least one interface component or the at least one layer of the industrial environment. The managing also includes indexing specific functional feature(s) of the at least one interface component and searching across the set of layers for one or more interface components that satisfy specific functional criteria. Moreover, the managing can include supplying metadata related to interface component(s) or layer(s).

15 Claims, 18 Drawing Sheets

Related U.S. Application Data filed on Sep. 29, 2006, now Pat. No. 7,835,805, and a continuation-in-part of application No. 11/536,760, filed on Sep. 29, 2006, now Pat. No. 7,912,560, and a continuation-in-part of application No. 11/536,791, filed on Sep. 29, 2006, now abandoned, and a continuation-in-part of application No. 12/241,319, filed on Sep. 30, 2008, and a continuation-in-part of application No. 12/241,327, filed on Sep. 30, 2008, now Pat. No. 8,265,775, and a continuation-in-part of application No. 12/241,342, filed on Sep. 30, 2008, now Pat. No. 8,041,435.

(56) References Cited

U.S. PATENT DOCUMENTS

| | | | |
|---|---|---|---|
| 5,530,861 A | 6/1996 | Diamant et al. | |
| 5,812,394 A | 9/1998 | Lewis et al. | |
| 5,907,704 A * | 5/1999 | Gudmundson et al. | 717/100 |
| 5,946,681 A | 8/1999 | Shorter | |
| 6,067,299 A | 5/2000 | DuRee | |
| 6,085,222 A | 7/2000 | Fujino et al. | |
| 6,104,962 A | 8/2000 | Sastry | |
| 6,154,684 A | 11/2000 | Schwenke et al. | |
| 6,269,254 B1 | 7/2001 | Mathis | |
| 6,437,805 B1 | 8/2002 | Sojoodi et al. | |
| 6,477,435 B1 | 11/2002 | Ryan | |
| 6,505,247 B1 | 1/2003 | Steger et al. | |
| 6,539,271 B2 | 3/2003 | Lech et al. | |
| 6,553,268 B1 | 4/2003 | Schwenke et al. | |
| 6,615,166 B1 * | 9/2003 | Guheen et al. | 703/27 |
| 6,618,856 B2 | 9/2003 | Coburn et al. | |
| 6,718,533 B1 * | 4/2004 | Schneider et al. | 717/100 |
| 6,868,538 B1 | 3/2005 | Nixon et al. | |
| 7,016,759 B2 | 3/2006 | Kaever et al. | |
| 7,020,697 B1 | 3/2006 | Goodman et al. | |
| 7,043,311 B2 | 5/2006 | Nixon et al. | |
| 7,058,712 B1 | 6/2006 | Vasko et al. | |
| 7,080,066 B1 | 7/2006 | Scheurich et al. | |
| 7,089,530 B1 | 8/2006 | Dardinski et al. | |
| 7,096,465 B1 | 8/2006 | Dardinski et al. | |
| 7,146,232 B2 | 12/2006 | Staron et al. | |
| 7,159,007 B2 | 1/2007 | Stawikowski | |
| 7,194,446 B1 | 3/2007 | Bromley et al. | |
| 7,197,493 B2 | 3/2007 | Ashby et al. | |
| 7,225,037 B2 | 5/2007 | Shani | |
| 7,233,830 B1 | 6/2007 | Callaghan | |
| 7,266,677 B1 | 9/2007 | Bromley et al. | |
| 7,272,815 B1 | 9/2007 | Eldridge et al. | |
| 7,363,338 B2 | 4/2008 | Kaakani et al. | |
| 7,395,122 B2 | 7/2008 | Kreidler et al. | |
| 7,418,305 B2 | 8/2008 | Buesgen et al. | |
| 7,505,817 B2 | 3/2009 | McDaniel et al. | |
| 7,509,249 B2 | 3/2009 | Britt et al. | |
| 7,627,385 B2 | 12/2009 | McGreevy et al. | |
| 7,653,008 B2 | 1/2010 | Patrick et al. | |
| 7,676,279 B2 | 3/2010 | Hood et al. | |
| 7,970,830 B2 | 6/2011 | Staggs et al. | |
| 8,214,455 B2 | 7/2012 | Baier et al. | |
| 2001/0034557 A1 | 10/2001 | Hudson et al. | |
| 2001/0052113 A1 * | 12/2001 | Hearne et al. | 717/2 |
| 2002/0059272 A1 | 5/2002 | Porter | |
| 2002/0156548 A1 | 10/2002 | Arackaparambil et al. | |
| 2003/0023336 A1 | 1/2003 | Kreidler et al. | |
| 2003/0045950 A1 * | 3/2003 | Bronikowski et al. | 700/83 |
| 2003/0150927 A1 | 8/2003 | Rosen | |
| 2003/0163656 A1 | 8/2003 | Ganton | |
| 2004/0015568 A1 | 1/2004 | Kaakani et al. | |
| 2004/0139427 A1 | 7/2004 | Garvey | |
| 2004/0199925 A1 | 10/2004 | Nixon et al. | |
| 2004/0230328 A1 | 11/2004 | Armstrong et al. | |
| 2005/0080788 A1 | 4/2005 | Murata | |
| 2005/0125735 A1 | 6/2005 | Cohen et al. | |
| 2005/0234873 A1 | 10/2005 | Milligan | |
| 2005/0256735 A1 | 11/2005 | Bayne | |
| 2006/0031855 A1 | 2/2006 | Smithline | |
| 2006/0037008 A1 | 2/2006 | Stelzer et al. | |
| 2006/0059127 A1 * | 3/2006 | Berry et al. | 707/3 |
| 2006/0179032 A1 | 8/2006 | Gottsman et al. | |
| 2006/0206448 A1 | 9/2006 | Hyder et al. | |
| 2006/0212146 A1 | 9/2006 | Johnson et al. | |
| 2006/0259954 A1 | 11/2006 | Patrick et al. | |
| 2006/0271505 A1 * | 11/2006 | Vierich et al. | 707/2 |
| 2006/0277289 A1 | 12/2006 | Bayliss et al. | |
| 2007/0011281 A1 | 1/2007 | Jhoney et al. | |
| 2007/0055757 A1 | 3/2007 | Mairs et al. | |
| 2007/0073850 A1 | 3/2007 | Callaghan et al. | |
| 2007/0089063 A1 | 4/2007 | Breyer | |
| 2007/0124475 A1 | 5/2007 | Syed et al. | |
| 2007/0142941 A1 | 6/2007 | McGreevy et al. | |
| 2007/0250630 A1 | 10/2007 | Blanding | |
| 2007/0256051 A1 | 11/2007 | Rojer | |
| 2008/0022151 A1 | 1/2008 | Stange et al. | |
| 2008/0040477 A1 | 2/2008 | Johnson et al. | |
| 2008/0079558 A1 | 4/2008 | Dorgelo et al. | |
| 2008/0082186 A1 | 4/2008 | Hood et al. | |
| 2008/0082577 A1 | 4/2008 | Hood | |
| 2008/0082636 A1 | 4/2008 | Hofmann et al. | |
| 2008/0082959 A1 * | 4/2008 | Fowler | 717/104 |
| 2008/0092131 A1 | 4/2008 | McIntyre et al. | |
| 2008/0127065 A1 * | 5/2008 | Bryant et al. | 717/109 |
| 2008/0140230 A1 | 6/2008 | Bromley | |
| 2008/0201297 A1 | 8/2008 | Choi et al. | |
| 2008/0208361 A1 | 8/2008 | Grgic | |
| 2008/0208368 A1 | 8/2008 | Grgic | |
| 2009/0083705 A1 * | 3/2009 | Phillips et al. | 717/113 |
| 2009/0083843 A1 | 3/2009 | Wilkinson et al. | |
| 2009/0328012 A1 * | 12/2009 | Aharoni et al. | 717/140 |
| 2010/0088104 A1 | 4/2010 | DeRemer et al. | |
| 2010/0192125 A1 | 7/2010 | Son et al. | |

FOREIGN PATENT DOCUMENTS

| | | |
|---|---|---|
| DE | 19614789 C1 | 9/1997 |
| DE | 101 29 564 A1 | 9/2002 |
| EP | 1276026 A | 1/2003 |
| EP | 1422619 A | 5/2004 |
| EP | 1 772 785 A | 4/2007 |
| EP | 1 906 276 A2 | 4/2008 |
| EP | 1 936 496 A1 | 6/2008 |
| EP | 1 906 276 A3 | 12/2009 |
| EP | 2 169 597 A1 | 3/2010 |
| EP | 2 169 598 A1 | 3/2010 |
| EP | 2 169 599 A1 | 3/2010 |
| WO | 0195041 A1 | 12/2001 |
| WO | 02/31607 A | 4/2002 |
| WO | 2004086160 A1 | 10/2004 |

OTHER PUBLICATIONS

OA dated Feb. 24, 2011 for U.S. Appl. No. 12/241,342, 35 pages.
OA dated May 10, 2011 for U.S. Appl. No. 11/536,791, 46 pages.
OA dated Jan. 25, 2012 for U.S. Appl. No. 12/241,327, 45 pages.
OA dated Aug. 20, 2012 for U.S. Appl. No. 12/893,545, 52 pages.
Article entitled "Viewanyware solutions from Rockwell Automation", by SAIMC, dated May 2001.
Article entitled "Automation Today", by Rockwell, dated Feb. 2001.
Article entitled "ViewAnyWare" by Rockwell, dated Jun. 10, 2004.
Article entitled "ViewAnyWare: Picture the Reaility" by Rockwell, Copyright 2004.
OA dated Aug. 2, 2012 for U.S. Appl. No. 12/893,366, 50 pages.
OA dated Oct. 24, 2011 for U.S. Appl. No. 11/536,791, 35 pages.
OA dated Dec. 16, 2010 for U.S. Appl. No. 11/536,818, 50 pages.
European Search Report for European Patent Application No. EP07117140, dated May 7, 2008, 8 pages.
Sweet, et al. Managing Technology Change in Industrial Automation. Proceedings of the Third IEEE Conference on Control Applications, Aug. 24-26, 1994, pp. 3-6, vol. 1. An ABB Overview of Research Priorities.
Maaref, et al. Communication System for Industrial Automation, Proceedings of the IEEE International Symposium on Industrial Electronics, Jul. 7-11, 1997. Laboratoire Logiciels System Reseaux-Image, IEEE, pp. 1286-1291.

(56) References Cited

OTHER PUBLICATIONS

OA Dated Oct. 6, 2008 for U.S. Appl. No. 11/536,715, 23 pages.
OA Dated Oct. 29, 2008 for U.S. Appl. No. 11/536,746, 23 pages.
OA Dated Oct. 29, 2008 for U.S. Appl. No. 11/536,791, 43 pages.
OA Dated Oct. 7, 2008 for U.S. Appl. No. 11/536,760, 33 pages.
OA Dated Jan. 9, 2009 for U.S. Appl. No. 11/536,827, 18 pages.
OA dated Apr. 13, 2009 for U.S. Appl. No. 11/536,746, 23 pages.
OA dated Mar. 24, 2009 for U.S. Appl. No. 11/536,715, 38 pages.
OA dated Apr. 23, 2009 for U.S. Appl. No. 11/536,760, 22 pages.
OA dated Apr. 17, 2009 for U.S. Appl. No. 11/536,791, 37 pages.
OA dated Aug. 24, 2009 for U.S. Appl. No. 11/536,746, 18 pages.
OA dated Aug. 21, 2009 for U.S. Appl. No. 11/536,760, 17 pages.
OA dated Aug. 6, 2009 for U.S. Appl. No. 11/536,791, 38 pages.
OA dated Jun. 23, 2009 for U.S. Appl. No. 11/536,827, 22 pages.
OA dated Oct. 20, 2009 for U.S. Appl. No. 11/536,715, 41 pages.
European Search Report dated Nov. 20, 2009 for European Application No. EP 07 11 7192, 9 pages.
"SIMATIC, Working with STEP V5.1, Edition Aug. 2000, A5E00069681-03". Aug. 2000, Siemens, D-90327, Nurnberg, DE, XP002554626.
Fayad, et al. "HMI as a Maintainance tool." Advances in Instrumentation and Control, Instrument Society of America, Research Triangle Park, US, vol. 2, part 1, Jan. 1, 1998, pp. 119-134, XP000875207, ISSN: 1054-0032, p. 124, last paragraph-p. 133, last paragraph.
OA dated Jan. 26, 2010 for U.S. Appl. No. 11/536,791, 39 pages.
OA dated Mar. 8, 2010 for U.S. Appl. No. 11/536,760, 19 pages.
OA dated Mar. 8, 2010 for U.S. Appl. No. 11/536,746, 21 pages.
Raymond Staron, et al. Use of an Agent Type Library for the Design and Implementation of Highly Flexible Control Systems. Last accessed on Oct. 10, 2008, 6 pages.
Marvin J. Schwenke, et al. Specifying a Control Program with High Level Graphical Editors. (c) 2001 Society of Automotive Engineers, Inc. Last accessed on Oct. 10, 2008, 9 pages.
Marvin J. Schwenke, et al. Use of a Type Library to Speed Up PLC Program Design and Commissioning. Last accessed on Oct. 10, 2008, 13 pages.
European Search Report for European Application No. 09171807.2-1238 dated Feb. 4, 2008, 7 pages.
European Search Report on European Patent Application No. EP09171802.3-1238, dated Jan. 29, 2010, 6 pages.
European Search Report for European Application No. 09171806.4-1238 dated Apr. 2, 2010, 8 pages.
European Search Report dated Jan. 25, 2010 for European Application No. EP09171807, 2 pages.
OA dated May 14, 2010 for U.S. Appl. No. 11/536,715, 49 pages.
"Datastream 7i for SQL Server"; Jun. 13, 2006, Infor, 2 pages.
European Search Report Dated Jan. 21, 2010 for European Application No. EP09171802, 2 pages.
European Search Report Dated Jan. 27, 2010 for European Application No. EP09171806, 2 pages.
OA dated Sep. 17, 2010 for U.S. Appl. No. 12/241,319, 32 pages.
OA dated Feb. 4, 2013 for U.S. Appl. No. 12/893,545, 36 pages.
OA dated Feb. 1, 2013 for U.S. Appl. No. 12/893,366, 20 pages.
Office Action dated Jul. 19, 2013 for U.S. Appl. No. 12/241,319, 42 pages.
Office Action dated Sep. 30, 2013 for U.S. Appl. No. 12/893,550, 48 pages.

\* cited by examiner

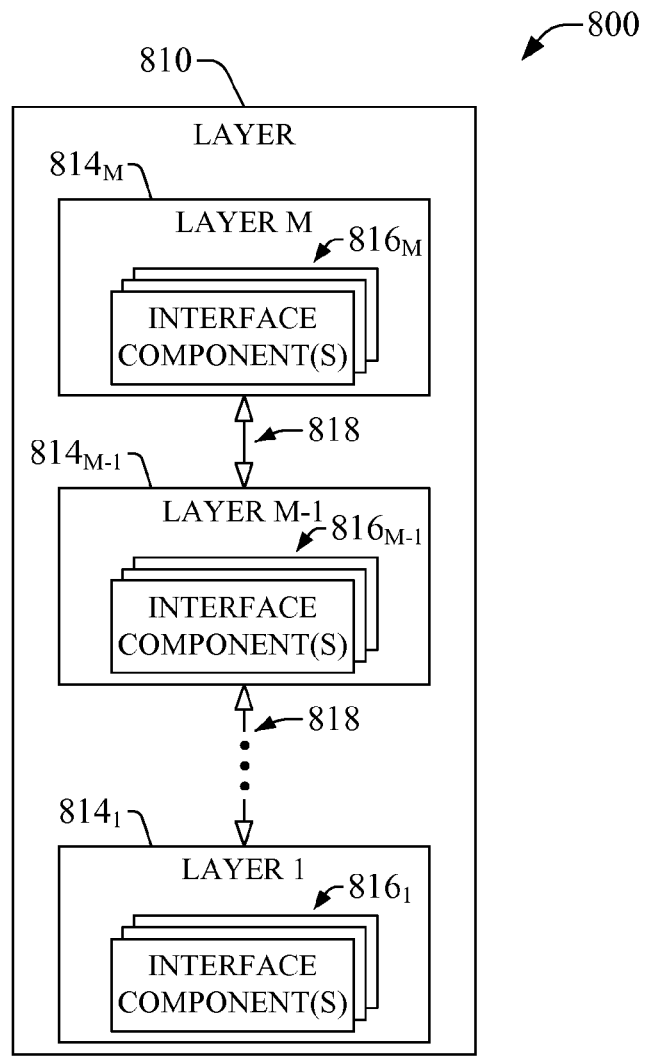
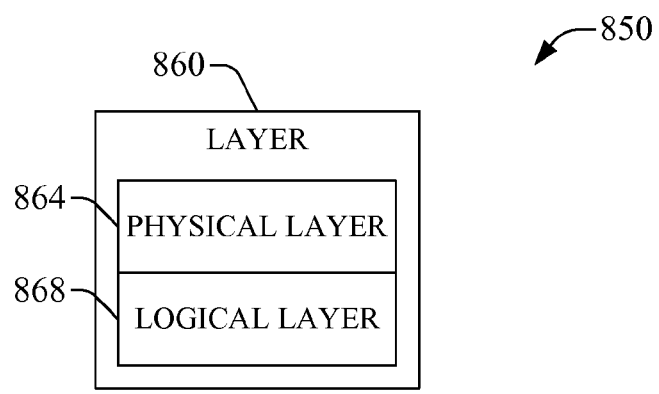
FIG. 8

LAYERED INTERFACE IN AN INDUSTRIAL ENVIRONMENT

CROSS-REFERENCE TO RELATED APPLICATIONS

This application is a Continuation-in-Part of co-pending U.S. patent application Ser. No. 11/536,715, entitled "MODULE STRUCTURE AND USE FOR INDUSTRIAL CONTROL SYSTEMS," filed on Sep. 29, 2006; this application is also a Continuation-in-Part of co-pending U.S. patent application Ser. No. 11/536,746, entitled "HMI VIEWS OF MODULES FOR INDUSTRIAL CONTROL SYSTEMS," filed on Sep. 29, 2006; this application is also a Continuation-in-Part of co-pending U.S. patent application Ser. No. 11/536,760, entitled "MODULE AND CONTROLLER OPERATION FOR INDUSTRIAL CONTROL SYSTEMS," filed on Sep. 29, 2006; this application is also a Continuation-in-Part of co-pending U.S. patent application Ser. No. 11/536,791, entitled "MODULE CLASSIFICATION AND SEARCHING FOR INDUSTRIAL CONTROL SYSTEMS," filed on Sep. 29, 2006; this application is also a Continuation-in-Part of co-pending U.S. patent application Ser. No. 12/241,319, entitled "MODULE AND HOST MATCHING," filed on Sep. 30, 2008; this application is also a Continuation-in-Part of co-pending U.S. patent application Ser. No. 12/241,327, entitled "MODULE PUBLICATION AND DISCOVERY," filed on Sep. 30, 2008; this application is also a Continuation-in-Part of co-pending U.S. patent application Ser. No. 12/241,342, entitled "MODULE DYNAMIC HOSTING," filed on Sep. 30, 2008, the entireties of which are incorporated herein by reference.

TECHNICAL FIELD

The subject disclosure relates generally to operation of an industrial environment and, more specifically, to implementing a set of interface components across a set of layers of the industrial environment and to managing at least one interface component or at least one layer of the industrial environment.

BACKGROUND

Industrial control systems can employ complex mechanical, electronic, electro-mechanical, and/or robotic machinery to perform various automated mechanical and/or electrical functions. Examples of machinery include industrial motors, pumps, conveyors, escalators, drills, refrigeration systems, and so forth. An industrial control system can utilize one or more control devices to activate or deactivate the machinery and/or to determine an appropriate level of activation for the machinery (e.g., an amount of current to supply to a variable input motor). Additionally, the control devices can be associated with logical program code that determines an appropriate time, degree, manner, and other criteria for operation of the machinery. For example, the determination can be based on various circumstances, including an output of another device, a reading of an optical sensor, an electronic measurement, a movement, a number of rotations of a device, and so on.

The machinery can be controlled by at least one industrial controller, such as, for example, programmable logic controllers. The industrial controllers can also communicate with higher level computing systems or servers that aggregate data from the controllers and help to manage day-to-day activities of an enterprise. As systems have become more complex, however, communications and functional cooperation between components of the industrial automation system has become a challenge. For instance, when users purchase multiple products from one or more vendors, there is often limited interoperability and consistency between such products. Software and control engineers must then learn each product and how the components interact with each other. Limited product and component consistency suggest that techniques engineers learn for one product do not necessarily carry over to other implementations.

Often, integration of products in the industrial automation system is complex and difficult to manage. Process and control engineers cannot easily code and configure their respective components without concern for other system components, which may have different manufacturers and different platforms.

Another problem with integration of products is that process and control engineers focus on underlying technical details, including implementation and glue logic, rather than the application level concerns, for example process information. For instance, an engineer may decide to automate a manual section of their plant. The design may start at a high level but soon becomes a series of discussions regarding nonfunctional requirements e.g., distributed component object model (DCOM), transmission control protocol (TCP), transaction rates, and the like. While these nonfunctional requirements are important, the design of functional requirements is where the true value is to the designer or end user. Thus, the engineer would prefer to focus on functional requirements (equipment control, product flow control, and so forth) providing direct improvements in value rather than dealing with superfluous technology issues.

In another case, system design does not sufficiently enable trade-offs between overhead burden (memory footprint, CPU cycles, and so forth) and application coupling. For instance, processing load should be distributed across the system in accordance with system capabilities. Thus, if one part of the system is shut down, alternative processing capability should be in place to allow production to continue. For example, control and process engineers can initially design and install a control system suiting their immediate needs. Current solutions however do not facilitate a smooth and uncomplicated transition for the respective changes. Multiple technologies underneath many vendors' products complicate configuration and management of systems. This is also aggravated when third party systems are involved. Such complexity hinders the system's capacity to provide higher-level information and can reduce the ability to configure such systems.

SUMMARY

The following presents a simplified summary in order to provide a basic understanding of some aspects of the subject disclosure. This summary is not an extensive overview, and it is not intended to identify key/critical elements of the subject disclosure or to delineate any scope. The sole purpose of this summary is to present some concepts in a simplified form as a prelude to the more detailed description that is presented later.

One or more embodiments in the subject disclosure enable implementing a set of interface components across a set of layers of an industrial environment, and managing at least one interface component or at least one layer of the industrial environment. To implement an interface component in at least one layer in the set of layers, a specification that defines the interface component is acquired and, based at least on the specification, a service is generated. Execution of the service implements the interface component. The managing includes deploying or discovering the at least one interface component or the at least one layer of the industrial environment. The managing also includes indexing specific functional feature(s) of the at least one interface component and searching across the set of layers for one or more interface components that satisfy specific functional criteria. Moreover, the managing can include supplying metadata related to the at least one interface component or the at least one layer of the industrial environment.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIG. 8 represents example embodiments of a layer in an industrial environment in accordance with aspects of the subject disclosure.

DETAILED DESCRIPTION

Figure 1:
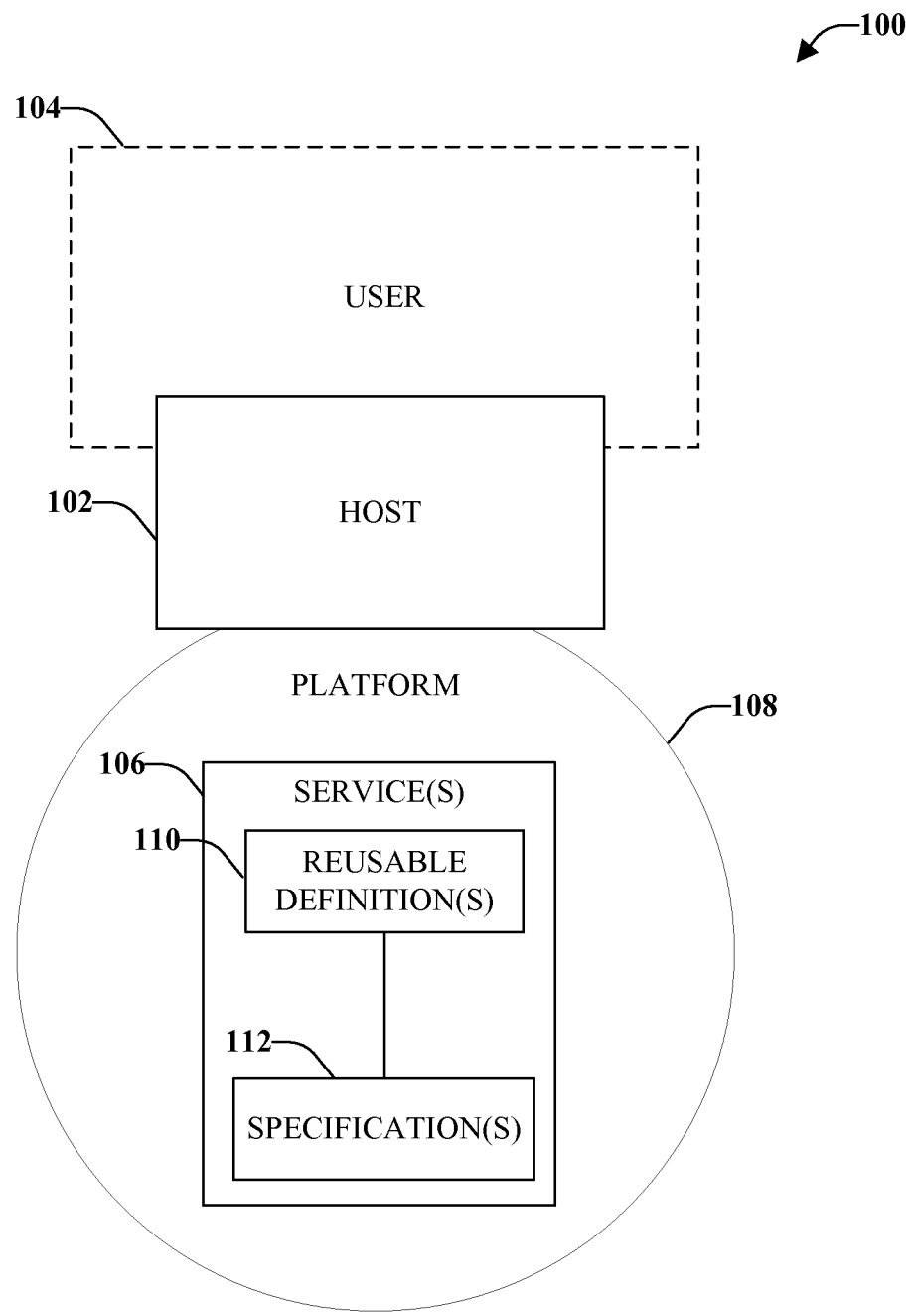
FIG. 1 is a block diagram illustrating interaction of a service and a host in an industrial automation system.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. In the subject disclosure, either of the foregoing entities is referred to as a functional element. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, station, node, interface, and the like.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set, e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; for example, a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Additionally, features or aspects described in the subject disclosure can rely, at least in part, on delivery or reception of query(ies), request(s), indication(s), or the like, and information or payload data associated therewith. Query(ies) or request(s) can be embodied in multi-bit words (e.g., P-bit words, with P a positive integer) and coded to specifically convey a request to a particular functional element (a host, equipment, etc.) in order to execute one or more specific actions. Payload data associated with query(ies) or request(s) can be embodied, for example, in one or more reserved bits in a packet header, a light-payload data packet, a field of dedicated bits, a lightweight file (e.g., a cookie), an email communication, an instant message, or the like. Query(ies), request(s), indication(s), or the like, can be delivered in accordance with various communication protocols, wireless or otherwise.

Referring initially to FIG. 1, illustrated is an example industrial automation system 100, according to an aspect. The industrial automation system 100 is configured to utilize modular automation to construct applications with reusable software that exposes functionality of components of the industrial automation system 100, while providing an abstraction from details of communication and interaction with such components.

The industrial automation system 100 includes a host 102 that is configured to interface with a user and/or entities (e.g., the Internet, another system, a computer, and so forth), hereinafter referred to as user 104. The interface between host 102 and user 104 can be through various interface mechanisms, including a human machine interface (HMI) or a graphical user interface (GUI). Although only a single host 102 is illustrated, industrial automation system 100 can include two or more hosts, according to an aspect. According to some aspects, the host 102 can be one or more industrial controllers (e.g., programmable automation controller (PAC), programmable logic controller (PLC), and so forth). The one or more industrial controllers can be associated with one or more human machine interfaces (HMIs). The term "industrial controller" as utilized herein can include functionality that can be shared across multiple components or networks.

The host 102 need not be limited to an industrial controller. According to some aspects, the host 102 can be (or can be associated with) one or more computer or network components within the industrial automation system 100. For example, the host 102 can be a computer, a server, a client, an industrial module, a human-machine interface (HMI), a graphical user interface (GUI), and so forth.

The host 102 can be configured to execute at least one service 106 based, at least in part, on input from the user 104. The service 106 is illustrated as contained within a platform 108, which can provide an interface between the host 102 and the service 106. For example, the service 106 can be an executable function for the industrial automation system 100 executed on a platform 108 of the host 102. By providing the interface between host 102 and the service 106, the platform 108 provides a set of abstractions that enable the service 106 to be implemented (e.g., compiled and executed) in disparate hosts without modification to the service. The platform 108 can be any type of hardware, software, or combination of hardware and software that allows the service 106 to run and/or execute; for instance, in certain embodiments, the platform 108 can be the Java™ programming language and computing platform. For example, the platform 108 can include one or more of a computer's architecture, an operating system, one or more programming languages, or user interfaces.

The service 106 can be employed as one or more executable functions for the industrial automation system 100. In accordance with some aspects, the service 106 is a reusable template that can be utilized in the development of software for the industrial automation system 100. The software can include, for example, control programs for physical manufacturing unit operations, such as assembly applications. The physical manufacturing unit can include, for example, conveyors, mixers, packaging units, process skids, robotic cells, tanks, valve matrices, and so forth. Additionally or alternatively, the software can include higher-level programs, such as batch processing applications, supervisory applications, monitoring applications, or control programs that control aspects of the industrial automation system 100.

According to some aspects, the service 106 can include one or more module objects, encapsulated objects, control objects, and so on. The service 106 can be configured to facilitate software development by hiding internal interfaces, messages, programming code, and so forth from the user 104 while providing standard and/or generic external interface(s). In accordance with some aspects, the service 106 can simplify programming in the industrial automation system 100 by allowing the user 104 (e.g., a process and control engineer) to work with published functionality of the service 106, which can be independent of how the functionality was achieved, which can mitigate integration and maintenance requirements and reduce costs. This can increase quality, consistency, and reusability of the software by providing a standardized programming structure between various components or hosts 102 (e.g., from different manufacturers) within the industrial automation system 100.

For example, utilizing services 106 can benefit both software developers and end users. For example, utilization of services can allow a developer of control applications to concentrate on the functionality of an application rather than the mechanics of implementation, such as by separating procedural control from equipment control. Services 106 can facilitate continuous software improvements; at the same time, services 106 can mitigate the risks that changes to the software may present to the industrial automation system 100. Utilization of services, as disclosed herein can simplify testing of software, and can provide a reduced chance that new software adversely affects other components or hosts 102 within the industrial automation system 100. This can also reduce development time, accelerate design cycles, and reduce cost. Services 106 can also allow end users (e.g., manufacturers) to separate procedural control from equipment control, which can allow end users to adopt existing assets to new product requirements with minimal time and capital investment.

According to various aspects, the service 106 can separate procedural control from equipment control by employing a hierarchically structured data model (e.g., a hierarchically structured data model according to the International Society for Automation (ISA)-88 standards). In such a manner, procedural control can be logically separated from equipment control. Logical separation can enable the separation of product-specific definitions, instructions, and information from processing equipment entities.

The service 106 can be configured to hide internal aspects from a user 104. For example, the service 106 (and/or platform 108) can include or can be associated with an interface. In accordance with some aspects, the interface can be located within the host 102. The interface can hide internal functions of the service 106, including the underlying code and complexity. According to an embodiment, the interface can define external behaviors supplied to at least one client application engaging the service 106. Through the interface, the service 106 can expose data, expose operations that can be performed, expose dependencies on other services, and so forth. The interface can allow the service 106 to connect to at least one other service to engage with a client application, according to an aspect. For example, an industrial process can be defined with a plurality of services, wherein a first service is a control service that controls a second service (e.g., equipment service) and a third service (e.g., material service), wherein the third service is subordinate to the second service. It is to be appreciated that the service 106 can support more than one interface, e.g., to engage with more than one client application, or to logically partition the functionality of the service. It should be appreciated that in certain scenarios a single interface can support a plurality of clients. Separation of a service 106 into multiple interfaces can allow one interface to be extended and/or changed without impacting other interface areas. Such separation can reduce the overall impact to areas of an industrial automation system that utilize the unchanged interface, but not the changed interface.

The interface can hide internal functions of the service 106. These internal functions can include one or more reusable definitions 110 and one or more specifications 112. At least one reusable definition or at least one specification embodies an implementation of a service and related interface(s). In accordance with some aspects, the service 106 can be an association of one or more reusable definitions 110 with one or more specifications 112. The one or more reusable definitions 110 and the one or more specification(s) 112 can include computer-executable programming code that, in response to execution thereof, can alter the state of one or more resources in an industrial automation system (e.g., logic code that can control opening and closing of a valve). The one or more reusable definition(s) 110 and the one or more specification(s) 112 can include programming code that is specific to a programming language, for example, ladder logic, function chart, scripting language, Java™, C, C#, C++, and so on. The one or more resources can include one or more of equipment, material, personnel, segments, storage, and so forth. For example, the resource may be a valve that is opened or closed according to logic code, where the logic code can be represented by at least one of specification(s) 112.

In accordance with some aspects, the programming code of the reusable definition 110 can be in a different physical location from the resource of the specification 112 within an enterprise resource control (ERC) system. It is to be appreciated that the service 106 can support more than one reusable definition 110. According to some aspects, different reusable definitions 110 can be targeted for different hosts such that a service 106 with more than one reusable definition 110 can be deployed to more than one host 102 where each host may have different computing capabilities and methods.

The service 106 can include external references (not illustrated) that can maintain metadata pertaining to the service 106, according to an aspect. For example, the external references can include information that describes dependencies of the service 106, required dependencies to support the reusable definitions 110 (e.g., operational requirements). The external references can also include, for example, specific qualities (e.g., performance, reliability, physical characteristics . . . ) of the service 106 and/or security aspects (e.g., security rules and automatic application thereof, or authentication procedures) of the service 106. The service 106 may also include other portions (not shown), such as local data, visualization elements, etc. Alternatively, a service 106 may be more limited in nature (e.g., only including a single specification 112).

Figure 2:
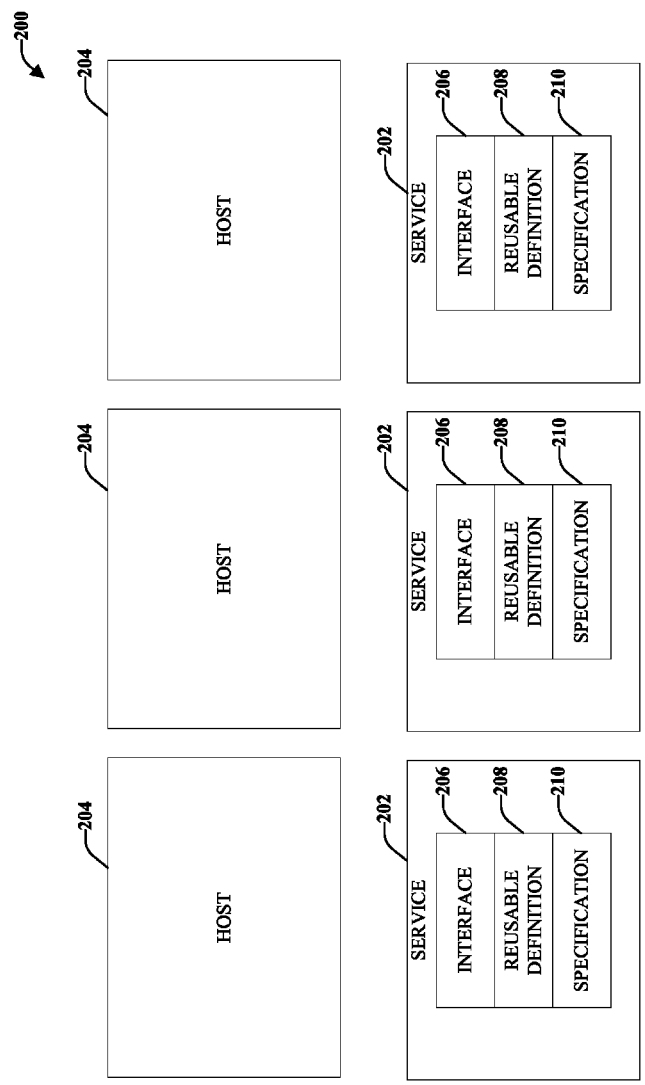
FIG. 2 is a block diagram illustrating a system that utilizes services and hosts.

FIG. 2 illustrates an example system 200, according to an aspect. System 200 can be a portion of an industrial control configuration of an industrial automation system. Included in system 200 are services 202 (e.g., modular objects, encapsulated objects, control objects, etc.) that can exist in conjunction with a one or more hosts 204 upon an industrial control configuration. For example, the services 202 can exist in conjunction with the hosts 204 through an interface 206. Functionality related to the services 202 can be similar to plug-in approaches in software. For example, services 202 can be connected to control a process in the industrial control environment. Services 202 can be customizable and reusable, for example, among multiple users, multiple locations, multiple platforms, and/or multiple hosts 204.

The services 202 can grow into different layers of an organizational hierarchy to form a service-oriented control system. For example, an industrial process can be defined with a plurality of services 202, wherein one service is a control service, which controls an equipment service and a material service, wherein the material service is subordinate to the equipment service.

Generally, the service 202 is an association of one or more reusable definitions 208 with one or more specifications 210. Reusable definitions 208 and specifications 210 can include computer-executable programming code (or programming code) that, in response to execution thereof, can alter a state of one or more resources in the industrial control environment. For example, the reusable definitions 208 and specifications 210 can be at least one of logic code, including ladder logic, function chart, script, Java™, C code, and the like. It is to be appreciated that a service 202 can support multiple reusable definitions 208 (e.g., to engage with multiple hosts 204) or multiple specifications 210. The one or more resources can include one or more of equipment, material, personnel, segments, storage, and the like. For example, the resource may be a valve that is opened or closed according to logic code.

Similar to a plug-in approach in software, a service 202 can hide internal aspects (e.g., reusable definitions 208 and specifications 210) from a user. The service 202 can hide these aspects by providing standard and/or generic interfaces 206 to external systems. According to an embodiment, the interface 206 can allow the service 202 to expose external reference information about the service 202. For example, the external reference information can include information describing dependencies of the service 202, required connections to support the reusable definition 208, and the like. The service 202 can support multiple interfaces 206, which can allow the service 202 to engage with multiple hosts 204.

According to an embodiment, users and/or hosts 204 can access the services 202 across a network (not shown). The network may include, for example, any public or private network. For example, services 202 can be created in an offline manner, such as in a computer database (not shown). When created offline, the services 202 can be downloaded for execution on the hosts 204.

Figure 3:
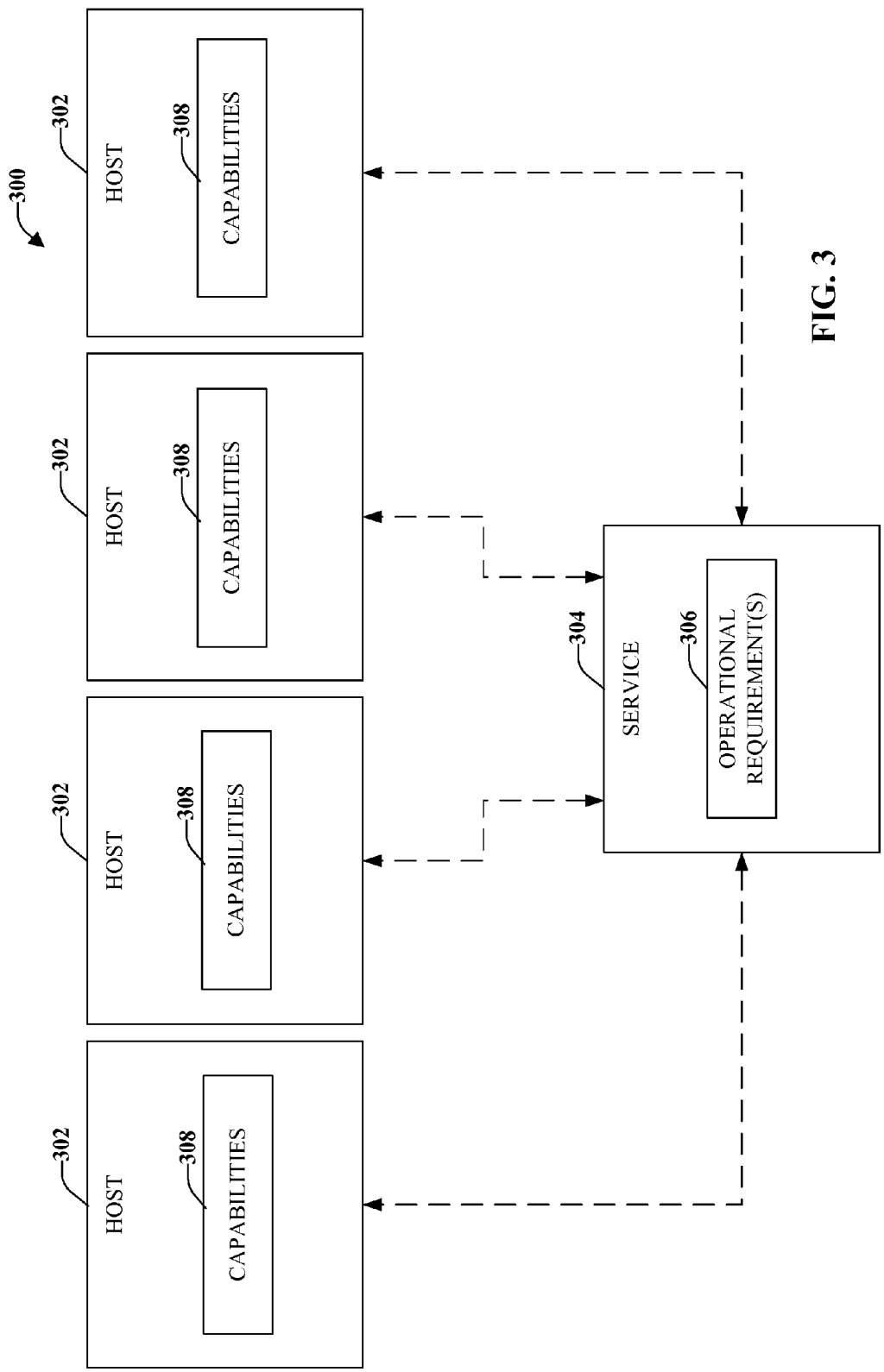
FIG. 3 is a block diagram illustrating a system for matching services and hosts.

FIG. 3 illustrates an example system 300 for expressing matching among hosts 302 and a service 304. The service 304 can have one or more operation requirements 306. For example, the operation requirements 306 can be that a host should have a high resolution size and a large memory. Hosts 302 can have different capabilities 308 that can be exploited by the service 304. A binding (represented with a dotted line) can be created with a host in an attempt to match one or more operational requirement 306 with one or more capabilities 308. If more than one host 302 includes one or more hosting capabilities 308 that match one or more operational requirements 306 of a service 304, then multiple bindings can be created and/or selection of a single host can occur and one binding can be used. If no host 302 has a capability 308 matching an operational requirement 306 of the service 304, then an error message can be generated. In accordance with some aspects, if there are no current hosts 302 that match an operational requirement 306, periodic or continuous observation of the environment can occur to detect when a new host 302 that has the required capability 308 enters the environment. The periodic or continuous monitoring can also occur to detect modifications to an existing host 302 to determine when the host 302 has been modified and now meets at least one operational requirement 306 of the service 304.

Figure 4:
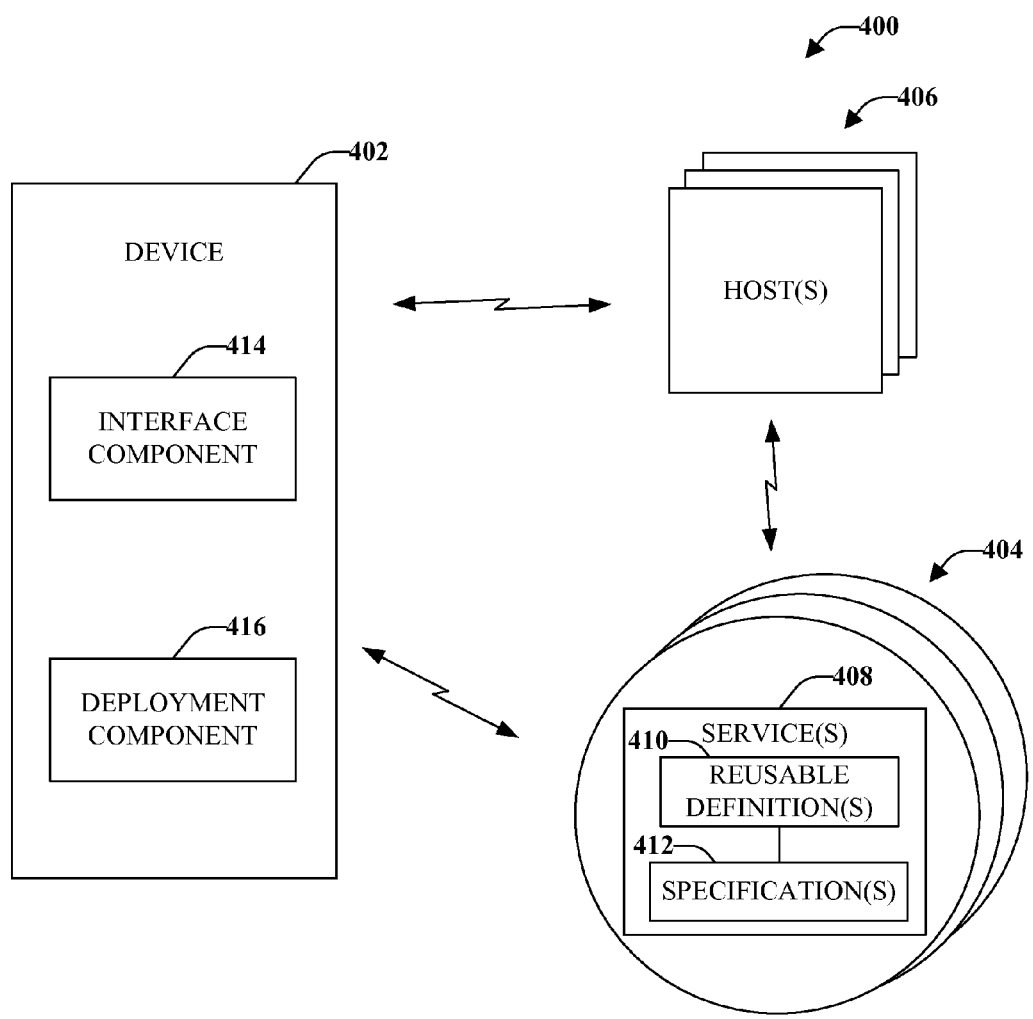
FIG. 4 illustrates an industrial control system that supports multiple platform configurations, according to an aspect.

FIG. 4 illustrates an example industrial control system 400 that supports multiple platform configurations, according to an aspect. Support of multiple interfaces associated with multiple services and related platform configurations enables grouping and namespace separation. Multiple platform configurations can also support visibility controls, which can allow different users access to different sets of controls and objects. Platform configurations can be tagged to provide different functionality depending on the intended use of the platform configurations. Multiple platform configurations also enable scalable updating. Traditionally, the entire industrial control system is updated in response to changes in implementation of one or more of software, hardware, or firmware, necessary to operate the industrial system. However, with the one or more disclosed aspects, service(s) and associated platform configuration(s) are decoupled, which allows individual platform configurations to be revisioned (e.g., updated) separately. The decoupled platform configuration(s) allow each platform configuration to be reused with different implementations (e.g., implementation of software or firmware) and objects. Additionally or alternatively, the platform configuration can reuse specific methods in which reusable definitions contain only the definitions of operation. This is a more granular approach than the approach traditionally performed (e.g., where whole services are reused).

Included in industrial control system 400 is a device 402 that interacts with multiple platform configurations 404. Each of the different platform configurations 404 can be utilized with different host(s) 406 within the industrial control system 400 (or within a related architecture). In accordance with some aspects, a single host 406 is utilized with multiple platform configurations 404. Although various aspects herein illustrate connections between device 402, platform configurations 404, and host(s) 406 as wireless links, according to some aspects, the links can be wireline links, or both wireless and wireline links.

The multiple platform configurations 404 can include one or more services 408 associated with one or more reusable definitions 410 and/or one or more specifications 412. In accordance with some aspects, different platform configurations 404 can use a common service 408, a common reusable definition 410, a common specification 412, or combinations thereof. Each component (e.g., service, reusable definition, specification) of the platform can be located anywhere within an industrial control system 400 and does not need to be co-located with other components of the platform and/or the host(s) 406.

Device 402 comprises an interface component 414 that is configured to provide a set of functional connections and controls for various automated host implementations, wherein the automated host implementations are configured to interact with a plurality of platform configurations. In accordance with some aspects, the automated implementation of the host is execution of a service that comprises a reusable definition and a specification. Interface component 414 can provide a mechanism for interaction between a user and/or entity (e.g., the Internet, another system, a computer, and so on, hereinafter referred to as user), the one or more hosts 406, and the multiple platform configurations 404. For instance, the interface component 414 can be, but is not limited to being, a keyboard, a mouse, a pressure-sensitive screen, a graphical user interface, a microphone, and voice recognition software. In accordance with some aspects, the one or more hosts 406 and the device 402 can be in separate locations within the industrial control system 400 or another location (e.g., satellite plant, vendor location, client location, and so forth).

In accordance with some aspects, device 402 is configured to be utilized for one host 406, wherein the device 402 is independent of the implementation and is transparent to the end user. In such a manner, device 402 can be reused on multiple hosts that are functional equivalents but that may have fundamental underlying differences. Thus, logic can be implemented in different languages, different software bases, and so forth.

Also included in device 402 is a deployment component 416 that is configured to support a plurality of platform configurations 404. Deployment component 416 can be configured to enable a second platform configuration from a set of alternative platform configurations. Further, the deployment component 416 can be functionally independent of the platform configurations 404. For example, deployment component 416 can be configured to be reused on multiple platform configurations that are functional equivalents, but have underlying differences. For example, at least one multiple platform configuration can have a different programming language than at least one other of the multiple platform configurations. However, even though the platform configurations have different programming languages, the deployment component 416 is configured to support both languages and, therefore, both platform configurations. In accordance with some aspects, deployment component 416 does not support each individual language but instead utilizes a high-level programming code that can interface with multiple programming languages without being programming language specific.

Additionally or alternatively, deployment component 416 can be configured to support platform configurations having different implementations. For example, one implementation can be in an industrial automated controller and a second implementation can be in a software system. The support of different implementations can allow an end application to be indifferent or unbound to a current implementation on another end application.

According to some aspects, deployment component 416 can be configured to capture a command or action regardless of how the command or action is used. For example, an action might be that if a certain condition occurs, an alarm (e.g., a specification) is activated. A similar specification (e.g., alarm) can be employed when a different event occurs. Even though a similar specification (e.g., alarm) is used in both cases, the deployment component 416 allows the reusable definition to interact with the specification (e.g., alarm) even though the specification is being utilized differently by two different automated host implementations.

In accordance with some aspects, deployment component 416 can aggregate one or more services 408, one or more reusable definitions 410, and/or one or more specifications 412. The aggregation can include identifying two or more services, two or more reusable definitions, and/or two or more specifications that are similar and determining that the similar services, reusable definitions, and/or specifications can be aggregated or utilized interchangeably. In accordance with some aspects, deployment component 416 aggregates based at least in part on a language requirement of an implementation of the at least one service. According to some aspects, deployment component 416 aggregates based at least in part on metadata related to an implementation of the at least one service. In some aspects, deployment component 416 aggregates based at least in part on an analysis of the at least one of a plurality of capabilities. In additional or alternative aspects, deployment component 416 aggregates in response to definition of user-specific configuration of industrial control system 400.

Aggregation of a group of services results in a composite service, or composite object. The composite service includes at least one interface from each of the services in the group of services. As indicated supra, deployment component 416 can aggregate the group of services. In addition, in certain embodiments, deployment component 416 can manage the at least one interface of each of the services in the group of services. The management can be effected in accordance with two approaches: (1) Compact. The set of interfaces spanned by the at least one interface of each of the services in the group of services can form the composite service with a single, compact interface associated with the composite service. In this approach, at least a sub-set of one or more interface(s) in the set of interfaces are hidden and not available to users (machine or human agent) disjointedly from, or outside, the composite service. (2) Loose. Each interface in the set of interfaces spanned by the at least one interface of each of the services in the group of services is transferred intact into the composite service. Such set of interfaces embody the interface of the composite service; the composite service retains the interface(s) in the set of interfaces as individual entities. Each interface can be exposed as part of formation of the composite service, but remains hidden otherwise.

Figure 5:
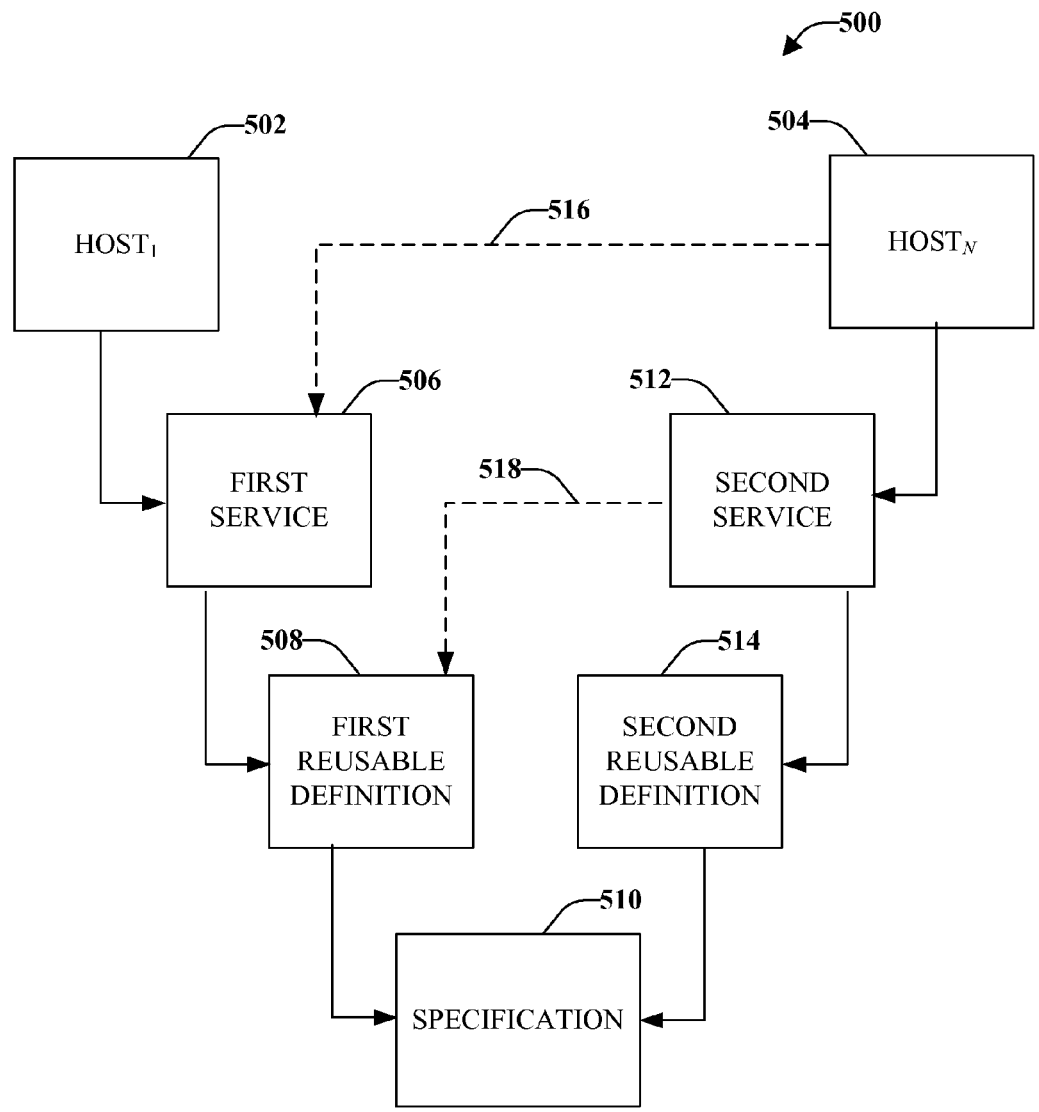
FIG. 5 illustrates a schematic representation of an example group of alternative platform configurations, according to an aspect.

In order to visualize a group of alternative platform configuration possibilities and/or aggregation of at least a portion of platform configurations, FIG. 5 illustrates a schematic representation 500 of an example group of alternative platform configurations, according to an aspect. Illustrated in the schematic representation 500 are multiple hosts, labeled $Host_1$ 502 and $Host_N$ 504, where N is an integer equal to or greater than one. $Host_1$ 502 can utilize a first service 506, which utilizes a first reusable definition 508, which utilizes a specification 510 (e.g., creating a platform configuration that comprises service 506, reusable definition 508, and specification 510). In a similar manner, $Host_N$ 504 can utilize a second service 512, which utilizes a second reusable definition 514, which utilizes the specification 510. However, in accordance with some aspects, another possibility for a platform configuration is that $Host_N$ 504 can utilize first service 506 as indicated at 516. In a similar manner, $Host_1$ 502 can alternatively utilize second service 512. Further second service 512 might alternatively utilize first reusable definition 508, as indicated at 518. In a similar manner, first service 506 might alternatively utilize second reusable definition 514. In accordance with some aspects, a host might utilize more than on service, more than one reusable definition, one or more specifications, or combinations thereof.

Figure 6:
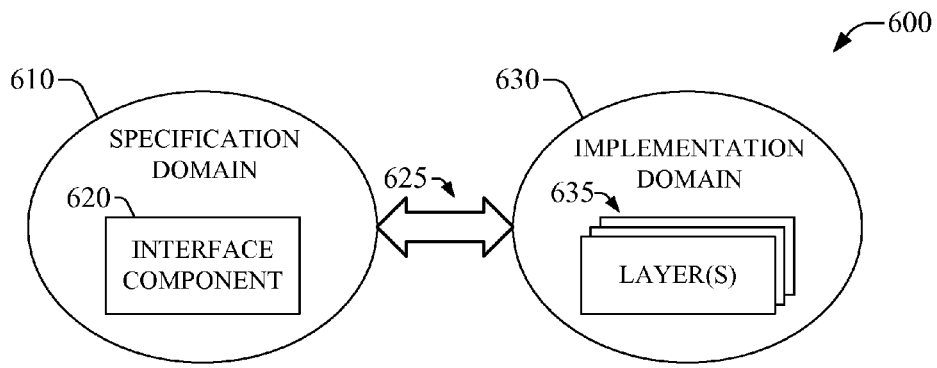
FIG. 6 represents an example industrial environment that enables and exploits various aspects described herein.

FIG. 6 is a block diagram that represents an example industrial environment 600 that enables and exploits various aspects described herein. The subject industrial environment 600 includes a specification domain 610 that enables generation of a specification that defines an interface component 620; the interface component 620 can be associated with a modular object, which can be either a hardware object or a software object. The specification includes information such as data, metadata, data type(s), code instructions, service profile(s), service procedure(s), or the like; the information defines the functionality of the interface component 620. The specification is an abstraction of the functionality of the interface component 620; such functionality is dictated, at least in part, by one or more functional features. The abstraction enables decoupling the functionality of the interface component 620 from structure (e.g., hardware structure or software structure) that enables such functionality. Accordingly, the abstraction is agnostic with respect to implementation of the functionality (e.g., one or more functional features) of the interface component 620. At least one advantage of decoupling the functionality of the interface component 620 from related structure is that the interface component 620 can be represented in terms of its functionality rather than details related to structure and, thus, such functionality can be implemented in one or more structures.

In example industrial environment 600, an implementation domain 630, coupled to specification domain 610 via one or more coupling component(s) 625, can implement the interface component 620. To at least such end, the implementation domain 630 instantiates the interface component 620. In the illustrated embodiment, the implementation domain 630 includes one or more operation layer(s) 635 (also referred to as one or more layer(s) 635) which can instantiate the interface component 620. The one or more layer(s) 635 embody disparate execution environments for an interface component 620. It should be appreciated that a single structure can be instantiated numerous times according to a plurality of services that enable the various instances of the structure. As an example, a programmable automation controller (PAC) with various control code installed in the PAC and configured to regulate an industrial process represents various instances of a controller interface component. As another example, an electronic operator interface (EOI) that executes a plurality of rendering projects also represents a plurality of instances of an operator interface component. In the subject disclosure, instantiation of the interface component 620 includes at least two stages: deployment of the structure associated with interface component 620, and generation of a service that enables the functionality conveyed by the specification of the interface component 620. In an aspect, at least one layer of the one or more layer(s) 635 can enable deployment (e.g., provisioning, activation, testing, and acceptance) of the structure related to the interface component 620. In another aspect, the at least one layer of the one or more layer(s) 635 can generate the service. Accordingly, a specification associated with the interface component 620 can be implemented across layer(s) of the one or more layer(s) 635 into which suitable structure has been deployed.

Figure 7:
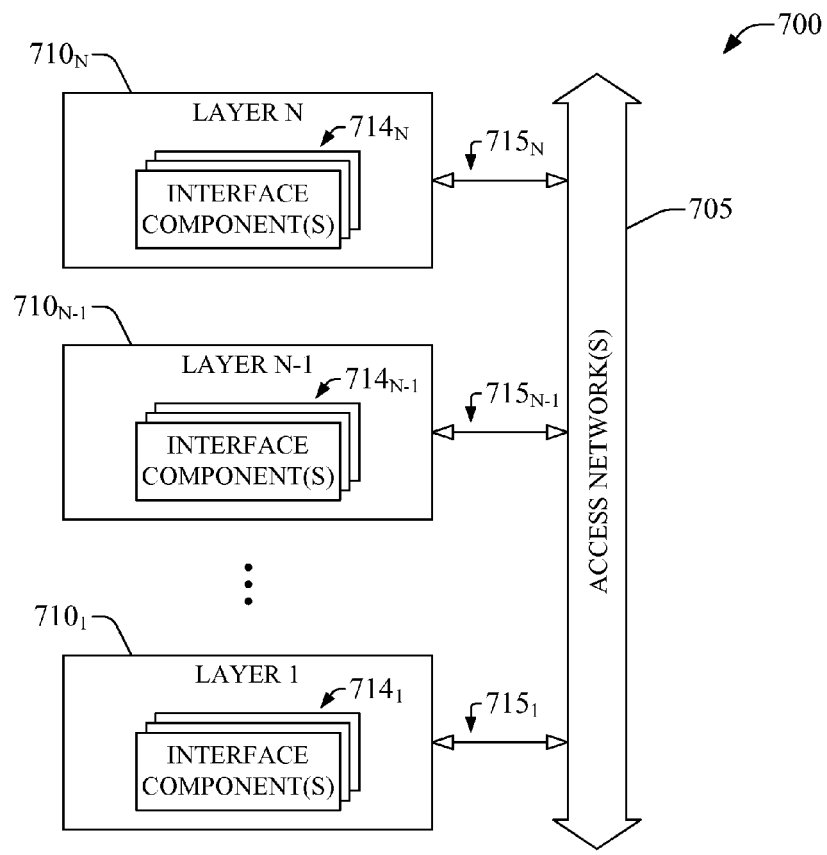
FIG. 7 represents an example industrial environment that can exploit layered interface(s) in accordance with aspects described herein.

FIG. 7 is a block diagram of an example industrial environment 700 that can exploit layered interface(s) in accordance with aspects described herein. The subject example industrial environment 700 includes a set of N layers $710_N$, $710_{N-1}$ ... $710_1$, with N a natural number equal to or greater than unity (1). In an aspect, the set of N layers embodies the one or more layer(s) 635. Layers $710_N$, $710_{N-1}$ ... $710_1$ are mutually functionally integrated. In an aspect, integration is accomplished in part through access network(s) 705 and specific communication interfaces that functionally couple (e.g., communicatively couple) each of the foregoing layers to such access network(s). Communication of information (data, metadata, signaling, etc) within each layer (e.g., layer $710_{N-1}$) in industrial environment 700 also is accomplished through access network(s) 705 and communication interfaces $715_1$-$715_N$. Communication interfaces $715_1$-$715_N$ can include network adaptor(s), port(s), reference link(s), or the like. In an aspect, for communication purposes, and related exchange of data or signaling, each layer in the set of N layers operates as a single logical unit. Thus, communication amongst disparate layers is carried out in the same or substantially the same manner irrespective of geographical location of functional elements (terminal(s), electronic operator interface(s), controller(s), server(s), device(s), tool(s), database(s), etc.) that exchange data.

In addition, a component in a local functional element (e.g., HMI or terminal) can access data available in the local functional element in the same or substantially the same manner as data available in a remote terminal (e.g., a remote HMI or terminal). While each layer in example industrial environment 700 operates as a single logical unit for purposes of exchange of data or signaling, each layer $710_K$, with κ=N, N−1 . . . 1 can include one or more functional elements associated with disparate operational environments (e.g., control environments in a control layer) and thus disparate portions of a single logical unit can operate under disparate requirement(s) or specification(s).

Access network(s) 705 can be geographically distributed and can include one or more of wireline network(s) or wireless network(s) that can operate in accordance with one or more communication protocols—for example, packet-based protocols such as internet protocol (IP), transmission control protocol (TCP), Ethernet, Ethernet TCP/IP, Control and Information Protocol (CIP) also referred to as Ethernet/IP, X.25, Asynchronous Transfer Mode (ATM) protocol, frame-based protocols such as frame relay, and circuit-switched protocols. In an aspect, access network(s) 705 can include service network(s) and control network(s). Service network(s) can comprise at least one network that enables communication of data comprising various data structures related to management data (e.g., plant planning data), graphic data, control data, control logic, manufacturing data (e.g., process recipes), or metadata related to one or more variables associated to the various data structures. Control network(s) primarily administer control data and data transactions related to a control environment. Implementation distinction amongst service network(s) and control network(s) in access network(s) 705 can enable improved integration of various functional elements within example industrial environment 700: For example, different parts of the control environment can be linked through custom or legacy control network(s), while exchange of information amongst the control environment and other network elements, such as a server in an enterprise network layer (e.g., back-end system), can be implemented through non-proprietary service network(s), such as an Ethernet network. It should be appreciated that in one or more embodiments, the service network(s) and the control network(s) are both embodied in the same physical network.

Each layer $710_K$ includes a group of one or more interface component(s) $714_K$. The group of one or more interface(s) $714_K$ can be instantiated within a set of hosts (not shown in FIG. 7) that are part of layer $710_K$. Instantiation of the group of one or more interface(s) $714_K$ can be effected in accordance with various relationships with the set of hosts (not shown): A one-to-one relationship, where a single interface component is instantiated in a single host; a one-to-many relationship, where a single interface component is instantiated in two or more hosts; a many-to-one relationship, where two or more interface component(s) are instantiated in a single host; or a many-to-many relationship, where two or more interface components are instantiated in two or more hosts. At least one interface component in a group of one or more interface component(s) (e.g., $714_{N-1}$) can be defined within a specification domain (e.g., 610) as described supra. In embodiments in which the specification domain overlaps, at least in part, with the implementation domain (e.g., 630) defined by the set of N layers $710_1$-$710_N$, a design layer (e.g., layer 1 $710_1$) can embody at least the part of the specification domain that overlaps with such implementation domain.

FIG. 8 represents example embodiments of a layer in an industrial environment in accordance with aspects of the subject disclosure. In embodiment 800, layer 810 includes a set of M layers $814_1$-$814_M$, with M a natural number equal to or greater than unity (1); each of these layers can be referred to as a sub-layer of layer 810. Each sub-layer $814_\gamma$, with γ=1, 2 . . . M, includes a set of one or more interface component(s) $816_\gamma$. Communication interface(s) 818 can include network adaptor(s), port(s), reference link(s), or the like, and enables communication amongst two or more of sub-layers $814_1$-$814_M$. The group of sets of one or more interface component(s) $816_1$-$816_M$ corresponds to a set of one or more interface component(s). In an example scenario in which layer 810 embodies layer $710_1$, the set of one or more interface(s) $816_1$-$816_M$ compose the set of one or more interface component(s) $714_1$. Layer 810 can embody one or more of layers $710_1$-$710_N$, or any layer within a referred to in the subject disclosure.

Decomposition of layer 810 into a set of sub-layers $814_1$-$814_M$ can be a logical decomposition based at least on operational feature(s) of layer 810 and complexity of such operational feature(s). In an aspect, sub-layer(s) in the set of sub-layers $814_1$-$814_M$ can present increasing complexity; for example, layer 1 $814_1$ can be the least complex relative to layer M $814_M$. Accordingly, the set of one or more interface component(s) $816_1$ can be the least complex relative to the set of one or more interface component(s) $816_M$.

As illustrated in embodiment 850, a layer 860 can include a physical layer 864 and a logical layer 868. Each of such layers also can be decomposed, or arranged, in sub-layers: Physical sub-layers and logical sub-layers. Both physical sub-layers and logical sub-layers can be ordered according to complexity, as described supra.

Figure 9:
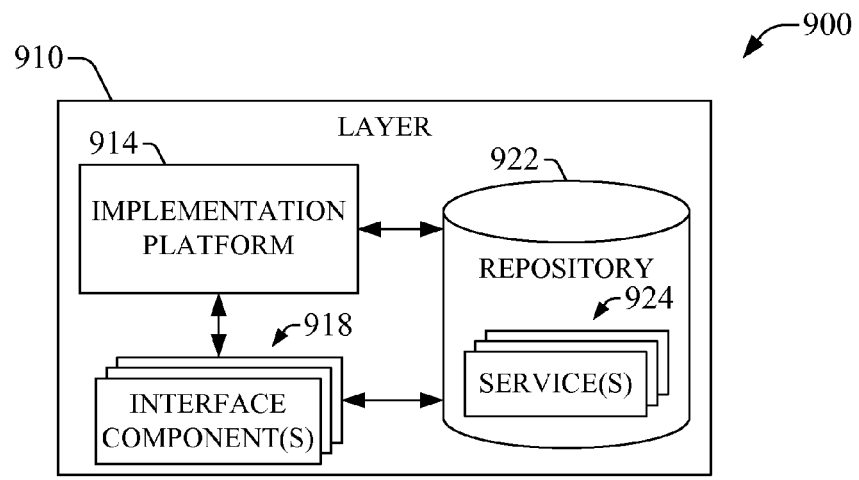
FIG. 9 illustrates an example embodiment of a layer in accordance with aspects of the subject disclosure.

FIG. 9 is a block diagram of an example embodiment 900 of a layer in accordance with aspects of the subject disclosure. Layer 910 embodies one or more of layers $710_K$ or $814_\gamma$, or any other layer described herein. Layer 910 includes an implementation platform 914 that instantiates an interface component of a group of one or more interface component(s) 918. In an aspect, to instantiate the interface component implementation platform 914 can acquire interface component and, based at least on information (data, metadata, etc.) related to the functionality of the interface component, generate a service configured to implement the interface component and functionality thereof. As described supra, the information can embody one or more specification for the group of one or more interface component(s); implementation platform 914 can retain such specification within a library (not shown) in repository 922. The service can be retained in a repository 922, as part of a memory element (register(s), database(s), directory(ies), etc.) that retains one or more service(s) 924; repository 922 can be part of a storage layer (not shown) of layer 910. In response to execution by implementation platform 914, or component(s) therein, the service can implement the interface component.

Figure 10:
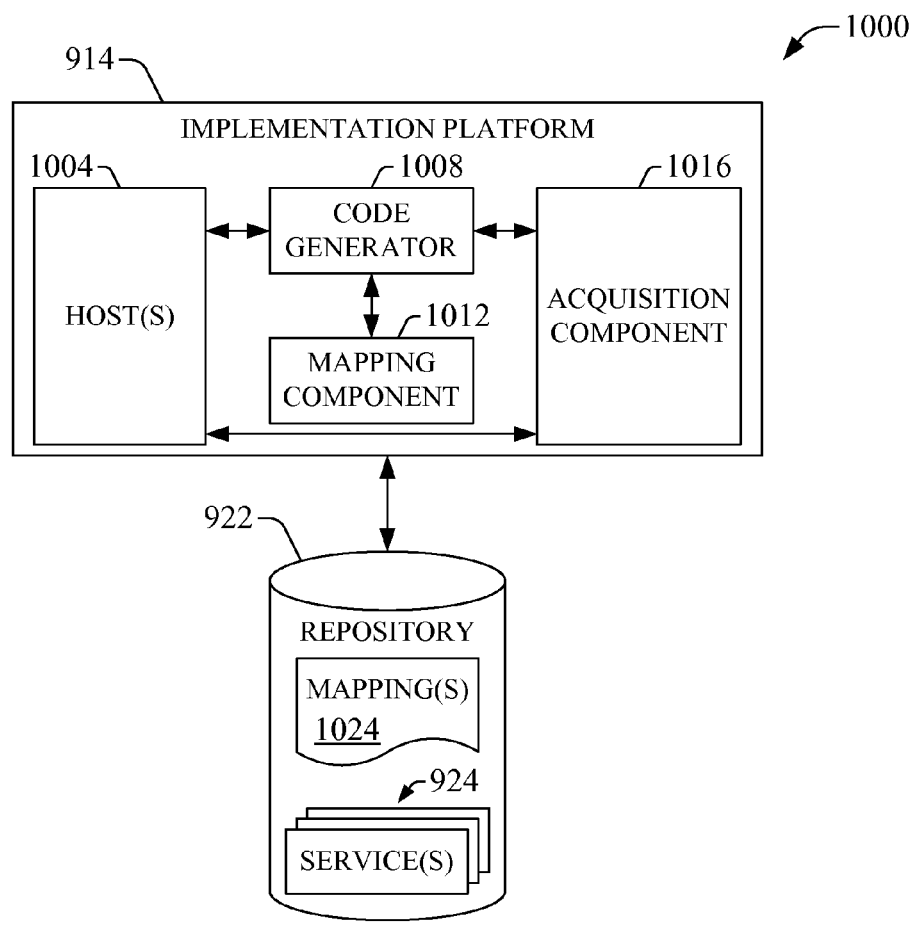
FIG. 10 presents an example embodiment of an implementation platform that enables an interface component within a layer of an industrial environment in accordance with aspects described herein.

In certain embodiments, implementation platform 914 can acquire an interface component from a disparate layer (not shown) or from a centralized network node (e.g., a host) that is part of an industrial environment that includes layer 910. In other embodiments, implementation platform 914 can acquire an interface component from a specific portion of layer 910. For instance, in a scenario in which layer 910 is a control layer, implementation platform 914 can acquire the interface component from a controller installed in a specific part of plant or factory. In an example embodiment, e.g., embodiment 1000 presented in FIG. 10, implementation platform 914 includes an acquisition component 1016 that can access (retrieve, receive, etc.) a specification that defines an interface component. Acquisition component 1016 can retain the specification (not shown) in repository 922. Acquisition component 1016 also can convey such specification.

In addition, in certain embodiments such as example embodiment 1000, implementation component 914 can include a code generator component 1008 (also referred to as code generator 1008) that enables implementation platform 914 to compose a service configured to implement the functionality of the interface component. Code generator 1008 can access (retrieve, receive, etc.) a specification that defines the interface component and, based on the specification, code generator 1008 can compose computer-executable programming code (e.g., a software application); code generator 1008 can compose the computer-executable code automatically (e.g., without human intervention). In addition, code generator 1008 can compile and link the service. Moreover, code generator 1008 also can link the service to one or more libraries (or re-usable definitions). In example embodiment 1000, to compose the computer-executable programming code, code generator 1008 can exploit a mapping component 1012 that can associate information (e.g., data, metadata, data type(s), code instructions, service profile(s), service procedure(s) . . . ) related to the interface component and disclosed in the specification with a set of computer-executable instructions. The mapping component 1012 can associate such information with the set of computer-executable instructions based at least on mapping(s) 1024. The mapping(s) 1024 are configurable and extensible and can be defined by an administrator (owner or lessee) of the industrial environment that contains layer 910; in an aspect, the mapping(s) 1024 can be generated at design time and can be utilized at runtime. The set of computer-executable instructions are specific to a programming language employed to execute the service generated to implement the interface component and functionality thereof. The programming language can be one of a high-level language, such as Java™, Perl, Python, Delphi, Microsoft® Visual Basic, C#, C++, ladder logic, function chart, or the like; device or controller code language, e.g., Verilog; assembly code; or the like. For an interface component in a design environment, the programming language can be domain-specific simulation languages, such as SIMAN.

In response to generating a service for an acquired interface component, code generator 1008 can signal host(s) 1004 that the service is available for implementing the functionality of the acquired interface component. In addition or in the alternative, code generator 1008 can store data (a logical variable, an alphanumeric value within a metadata field, etc.) in repository 922 wherein the data indicates the service is available. Host(s) 1004 or one or more processors therein can execute the computer-executable code associated with the service in order to implement the functionality of the acquired interface component within one or more layers.

Figure 11:
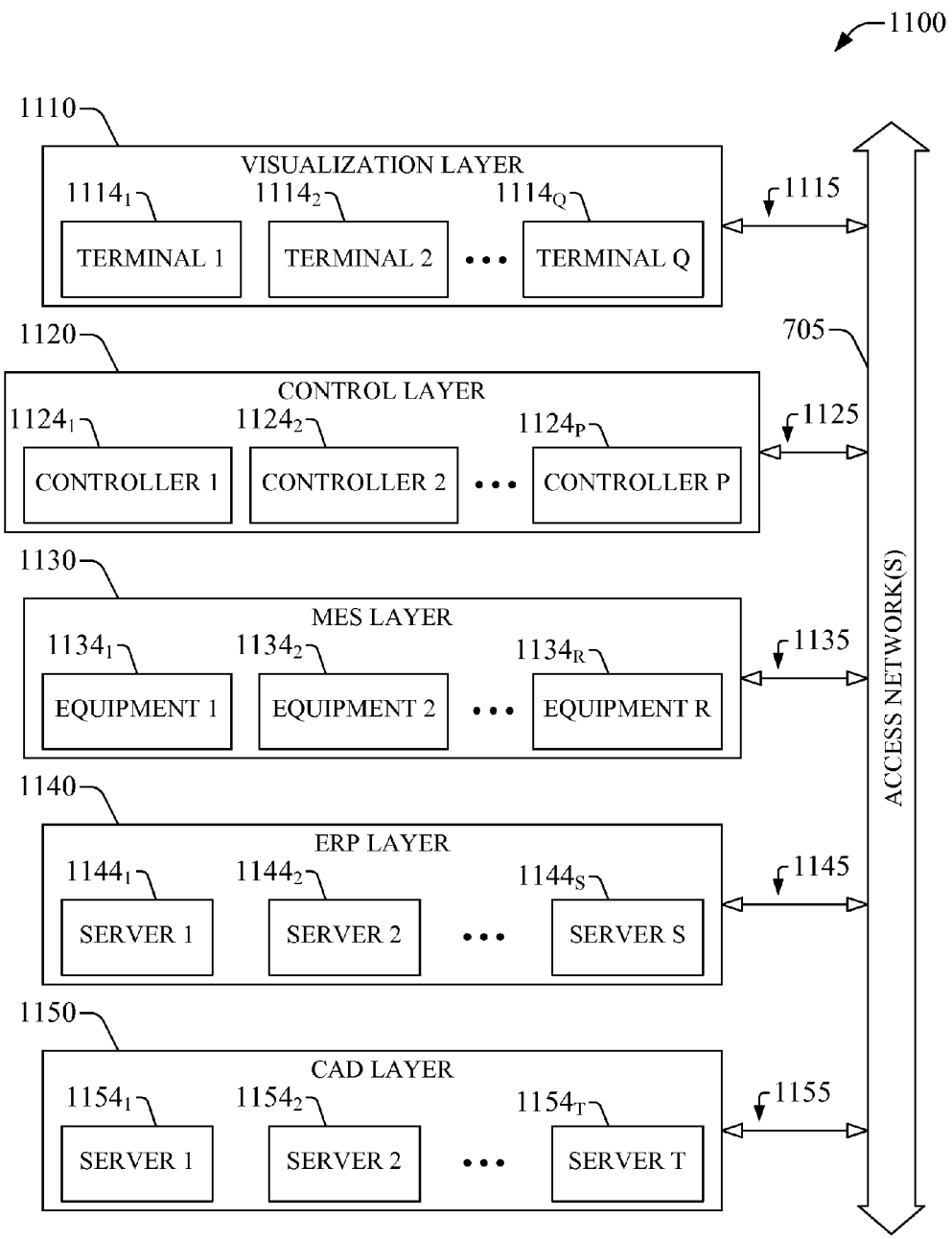
FIG. 11 illustrates an example industrial environment that can exploit layered interface(s) in accordance with aspects described herein.

FIG. 11 illustrates an example industrial environment 1100 that can exploit layered interface(s) in accordance with aspects described herein. The example industrial environment 1100 is an embodiment of example industrial environment 700, where N=5: Visualization layer 1110, control layer 1120, Manufacturing Execution System (MES) layer 1130, Enterprise Resource Planning (ERP) layer 1140, and Computer-Assisted Design (CAD) layer 1150. Layers 1110-1150 are mutually coupled (e.g., communicatively coupled) via access network(s) 705 and communication interfaces 1115-1155. Communication of information (data, metadata, signaling, etc) within each layer in example industrial environment 1100 also is accomplished through access network(s) 705 and interfaces 1115-1155. In each layer in the set of five layers 1110-1150, a representation of a physical layer is illustrated, whereas a logical layer is not represented. In addition, each layer in such set includes one or more interface component(s) (not shown).

Visualization layer 1110 includes a set of Q terminals $1114_1$-$1114_Q$, with Q a natural number greater than or equal to unity. The set of Q terminals $1114_1$-$1114_Q$ can embody the physical layer of visualization layer 1110. Terminal $1114_\lambda$, with $\lambda=1, 2 \ldots Q$, renders control data; terminal $1114_\lambda$ can be embodied in a dedicated HMI or electronic operator interface (EOI) or in a computer, such as a desktop computer, a mobile computer, a smartphone, that can render control data. In an aspect, visualization layer 1110 can be homogeneous and composed of networked workstations. In another aspect, visualization layer 1110 can be heterogeneous, with terminals $1114_1$-$1114_Q$ comprising a group of desktop computers, a group of workstations, and a group of dedicated HMIs; where HMIs in the group can have disparate functionality and can include legacy HMIs. In the embodiment in which the visualization layer 1110 is heterogeneous, disparate sub-layer can be configured in accordance with operational complexity (e.g., capabilities) of the various terminals that comprise the visualization layer 1110.

Visualization layer 1110 and control layer 1120 are functionally coupled (e.g., communicatively coupled) through access network(s) 705. One or more terminals in the set of terminals $1114_1$-$1114_Q$ render control data generated in control layer 1120. In the illustrated embodiment, control layer includes P controllers $1124_1$-$1124_P$, with P a natural number greater than or equal to unity (1). In one or more embodiments, controllers $1124_1$-$1124_P$ can be industrial controllers or industrial automation controllers. A controller in control layer 1120 can be embodied in one of a programmable logic controller (PLC), a PC-based controller, etc. Each of the controllers $1124_1$-$1124_P$ includes processor(s) (not shown), volatile memory and non-volatile memory (not shown), and other circuitry (not shown) that enables implementation of control process(es) (e.g., execution of control logic, or control code instructions) related to a specific control environment (not shown in FIG. 11).

Controllers $1124_1$-$1124_P$ and terminals $1114_1$-$1114_Q$ can be linked through a one one-to-many relationship or a one-to-one relationship. Terminals $1114_1$-$1114_Q$ and controllers $1124_1$-$1124_P$ can be distributed in disparate geographic locations. Accordingly, disparate functional elements of access network(s) 705 enable communication, and related exchange of data or signaling, amongst two or more terminals located in disparate geographic regions. In addition, such functional elements of access network(s) 705 can enable communication, and related exchange of data or signaling, amongst two or more controllers that reside in disparate geographical locations.

Control layer 1120 and MES layer 1130 also are functionally coupled (e.g., communicatively coupled) through access network(s) 705. It should be appreciated that in alternative or additional embodiments of example industrial environment 1100, the MES layer 1130 can be substituted or supplemented with a generic equipment layer (not shown). MES layer 1130 includes R controllers $1124_1$-$1124_R$, with R a natural number greater than or equal to unity (1). At least one controller in control layer 1120 can regulate operation of one or more equipment (e.g., equipment 1 $1134_1$ and equipment R $1134_R$) in MES layer 1130. In MES layer 1130, equipment includes associated process(es)—industrial process(es), manufacturing process(es), measurement process(es) in a laboratory, infrastructure development process(es), such as oil and gas prospecting and extraction, etc. Equipment in MES layer 1130 is specific to a market space (e.g., beverages, edible goods, textile goods, oil and gas . . . ) and can include one or more sets of tools, a group of machines, numerous systems and related sub-systems, real estate and associated infrastructure, and so forth.

In example industrial environment 1100, CAD layer 1150 can embody a design environment for visualization layer 1110 and control layer 1120. Accordingly, CAD layer 1150 can embody a specification domain, which overlaps with an implementation domain—visualization layer 1110 and control layer 1120 embody, at least in part, the implementation domain. CAD layer 1150 includes a set of T servers $1154_1$-$1154_T$, with T a natural number greater than or equal to unity (1). At least one server in the set of T servers $1154_1$-$1154_T$ enables to compose a specification, or contract, that defines an interface component (not shown) for one or more terminals in the set of terminals $1114_1$-$1114_Q$. In addition or in the alternative, a server in the set of T servers enables to compose a specification that defines an interface component (not shown) for at least one controller in control layer 1120.

In addition, in example industrial environment 1100, Enterprise Resource Planning (ERP) layer 1140 also is coupled to visualization layer 1110, control layer 1120, and MES layer 1130 via access network(s) 705 and communication interfaces 1115, 1125, 1135, and 1145. ERP layer 1140 includes a set of S servers $1144_1$-$1144_S$, with S a natural number greater than or equal to unity (1). At least one server in the set of S servers $1144_1$-$1144_S$ enables to compose a specification, or contract, that defines an interface component (not shown) for one or more terminals in the set of terminals $1114_1$-$1114_Q$. In addition or in the alternative, a server in the set of S servers enables to compose a specification that defines an interface component (not shown) for at least one controller in control layer 1120.

As described supra, for communication purposes, and related exchange of data or signaling, each layer operates as a single logical unit; communication amongst disparate layers (e.g., control layer 1120 and MES layer 1130) is carried out in the same or substantially the same manner irrespective of geographical location of the functional elements (e.g., controller P $1124_P$ and equipment 2 $1134_2$) that exchange data or signaling. In addition, a component in a local terminal (e.g., terminal P $1114_1$) can access data available in the local terminal in the same or substantially the same manner as data available in a remote terminal (e.g., terminal $1114_Q$). Similarly, data available in one or more controllers in control layer 1120 appears logically the same to local terminal(s) and remote terminal(s) within visualization layer 1110. As described supra, each layer in the plurality of layers 1110-1150 can include one or more functional elements associated with disparate execution environments (e.g., layers or respective portions thereof) and thus disparate portions of a single logical unit can operate under disparate requirement(s) or specification(s). The disparate portions can include a sub-set of interface components of a set of one or more interface component(s) that are part of the single logical unit.

Figure 12:
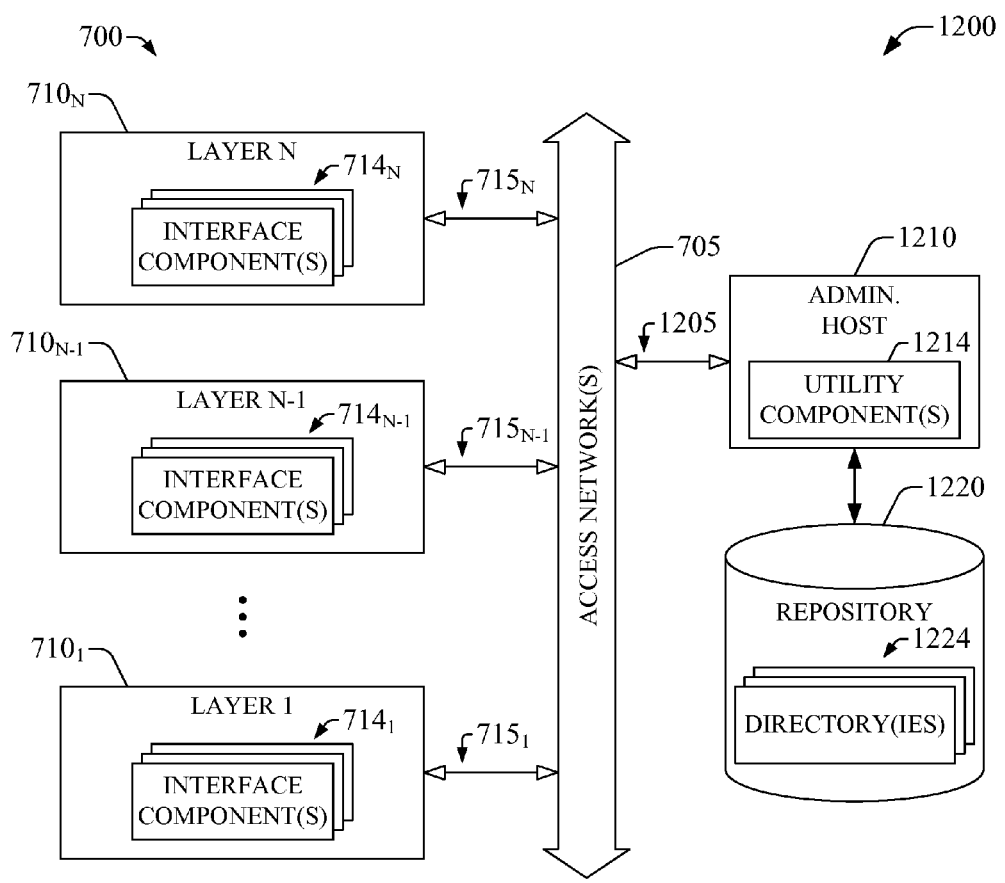
FIG. 12 depicts an example system that exploits layers of an industrial environment in accordance with aspects disclosed herein.

FIG. 12 is a block diagram of an example system 1200 that exploits layers of an industrial environment in accordance with aspects disclosed herein. The example system 1200 includes an administration (admin.) host 1210 that manages various aspects of one or more of layers in the set of layers $710_1$-$710_N$. To at least that end, administration host 1210 includes a set of one or more utility component(s) 1214 that enable extraction and administration of information related to at least one layer in the set of in the set of layers $710_1$-$710_N$ and at least one interface component in the group of interface component(s) $714_1$-$714_N$. In an aspect, extraction and administration of such information can be effected at runtime (rendering runtime, control runtime, manufacturing runtime, etc.) or at design time. Administration host 1210 can retain such information in one or more directory(ies) 1224 within a repository 1220. Administration host 1210 is functionally coupled to at least one layer in the set of layers $710_1$-$710_N$ via communication interface 1205 and access network(s) 705. While the administration host 1210 is illustrated as external to layers $710_1$-$710_N$, in one or more embodiments, administration host 1210 can be part of a single layer $710_K$ (e.g., an ERP layer) or one or more layers (e.g., layers $710_1$, $710_{N-1}$, and $710_N$). In scenarios in which administration host 1210 is part of a plurality of layers, the administration host 1210 can be replicated, at least in part, in each layer in the plurality of layers. Likewise, in such one or more embodiments, repository 1220 can be part of the layer $710_K$ or a disparate layer $710_{K'}$.

In additional or alternative embodiments, functionality of administration host 1210 can be effected in a server-client modality, wherein utility component(s) 1214 service one or more related client components (or clients) distributed across layers $710_1$-$710_N$.

Figure 13:
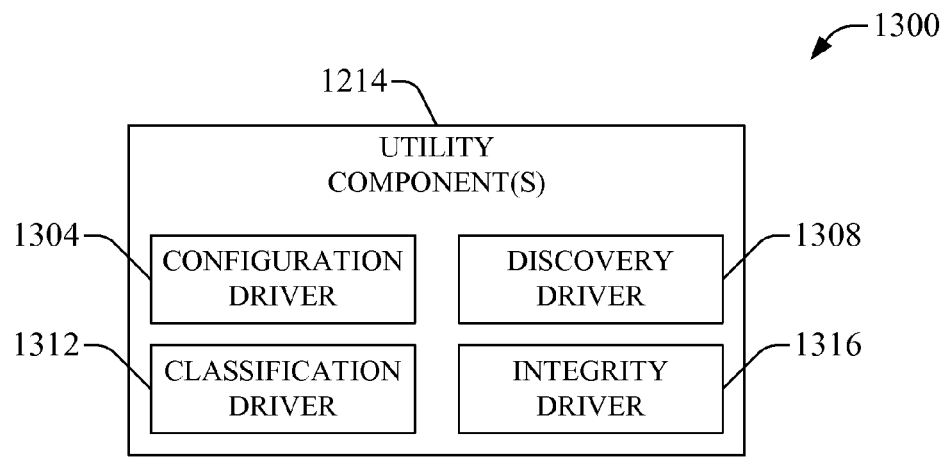
FIG. 13 presents an example embodiment of a component that provides or is configured to provide functionality to manage information related to one or more layers, and interface component(s) therein, in an industrial environment in accordance with aspects described herein.

In certain embodiments, as illustrated in example embodiment 1300 in FIG. 13, utility component(s) 1214 include a plurality of driver components that enable specific functionality. In the subject specification and annexed drawings, driver components are also referred to as drivers. In other embodiments, functionality of two or more drivers can be consolidated into a single driver. The plurality of driver components includes configuration driver 1304, discovery driver 1308, classification driver 1312, and integrity driver 1316. Configuration driver 1304 can provision a layer and functional element(s) therein, such as host(s), interface component(s), and the like. Configuration driver 1304 also can activate a provisioned layer and functional element(s) therein. As part of provisioning the layer, configuration driver 1304 can retain configuration record(s) in directory(ies) 1224 or other memory element(s) (memory register(s), a databases, table(s), file(s), etc.) within repository 1220. For a provisioned layer, configuration record(s) can include data indicative of identity (ID) and provisioning time of the provisioned layer and functional element(s) therein, such as interface component(s); operational importance of the provisioned layer; location of functional element(s) (e.g., host(s), interface component(s)) that are part of the provisioned layer; security profile(s) of the provisioned layer, such as acceptable security protocol(s) (protocol-based tunnel (e.g., virtual private network (VPN)) connectivity; on-site credential-token validation; etc.) to access the provisioned layer or one or more functional elements therein; and so forth. Physical location of functional element(s) within a layer can be conveyed by a logical address (e.g., an internet protocol (IP) address, or a URL (Universal Resource Locator)) assigned to the functional element(s). Configuration driver 1304 can communicate (e.g., broadcast) one or more configuration record(s) in response to provisioning or activating a layer in the industrial environment.

Discovery driver 1308 can identify a layer within the industrial environment that includes or is functionally coupled (e.g., communicatively coupled) to administration host 1210. Discovery driver 1308 also can identify an interface component within one or more layers in the industrial environment. In addition, discovery driver 1308 can extract data or metadata that characterizes the identified interface. In an aspect of discovery of a layer, discovery driver 1308 can identify a layer in response to the layer being deployed (e.g., provisioned and activated) within the industrial environment. In another aspect of discovery of a layer, the discovery driver 1308 can identify a first layer in response to a discovery request (e.g., a query, a computer-executable code instruction) received from a user device or a functional element (e.g., a host, an interface component, or the like) within a second layer. For a layer that is discovered, discovery driver 1308 can extract data or metadata related to the layer. In the subject disclosure, to identify a layer, discovery driver 1308 can scan.

In one or more embodiments, e.g., example embodiment 1400, discovery driver includes an extraction component 1414 that enables discovery driver 1308 to identify a layer and at least one interface, and acquire (retrieve, receive, etc.) data and metadata associated with the layer and the at least one interface therein. Extraction component 1414 can exploit one or more discovery criteria, which can be retained in discovery criterion storage 1434, to determine a condition in an industrial environment or industrial automation system that triggers discovery of a layer or the at least one interface, and related data and metadata. The one or more discovery criteria can include deployment of a layer; availability (e.g., issuance or reception) of a discovery request, occurrence of specific operation and maintenance (O&M) procedures; configuration or activation of a development mode in which design or debugging of the industrial environment, the industrial automation system, or a portion thereof, is carried out; etc. Discovery criteria are configurable and extensible; an administrator (e.g., an owner or operator) of an industrial environment, an industrial automation system, or a part thereof, can configure (define, modify, delete, etc.) at least one discovery criterion. In certain embodiments, discovery criteria can be supplied as part of one or more components (a host, equipment, a device, etc.)

In an aspect of discovery of an interface component, discovery driver 1308 can produce a plan or footprint of interface components within the set of layers $710_1$-$710_N$, and sublayers present in one or more layers in such set. In certain embodiments, e.g., example embodiment 1400, the footprint of interface components can be retained within one or more interface plan(s) 1442 within report storage 1438; a report component 1418 can retain the one or more interface plan(s) in memory 1430. The interface plan(s) 1442 can be accessible to other driver(s) within utility component(s) 1214, or to user device(s) or host(s) within one or more layers. In addition, in example embodiment 1400, report component 1418 can aggregate information related to functionality of one or more interface component(s) and produce intelligence related to functionality of one or more layers that include the one or more interface component(s).

Figure 14:
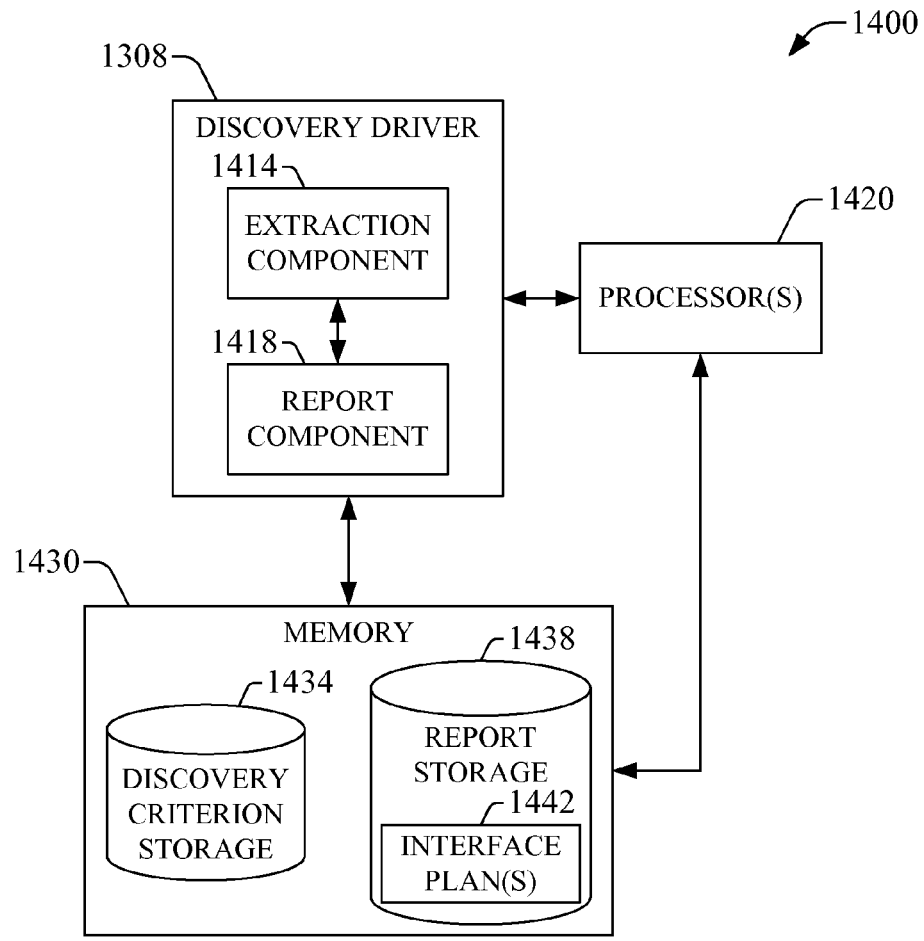
FIG. 14 is an example embodiment of a component that can discover at least one interface component or at least one layer within an industrial environment in accordance with aspects of the subject disclosure.

In example embodiment 1400, processor(s) 1420 can be part of admin host 1210 which includes utility component(s) 1214 of which discovery driver 1308 can be a part of as described supra. Processor(s) 1420 can be configured to execute or can execute computer-executable instructions (not shown) stored in a memory to implement or provide at least part of the described functionality of discovery driver 1308. In the illustrated example embodiment, such memory is memory 1430. In additional or alternative embodiments, the memory can be memory 1220 (not shown in FIG. 14). Such computer-executable instructions can include program modules or software or firmware applications that implement specific tasks which can be accomplished, for example, through one or more of the methods described in the subject specification and that are associated, at least in part, with functionality or operation of example system 1200. In one or more embodiments, discovery driver 1308 and components therein can be can be implemented as software or firmware that can be retained in memory 1430 as one or more sets of computer-executable instructions that, when executed by processor(s) 1420, implement such components and their associated functionality as described herein in various aspects. To provide such functionality, in one aspect, processor(s) 1420 can exploit a bus to functionally couple (e.g., communicatively couple) to discovery driver 1308 and memory 1430, and exchange data or any other information amongst discovery driver 1308, components therein, and memory 1430 or memory elements therein. The exchanged information can include at least one of computer-executable instruction(s), computer-executable code structure(s), data structures, or the like.

Figure 15:
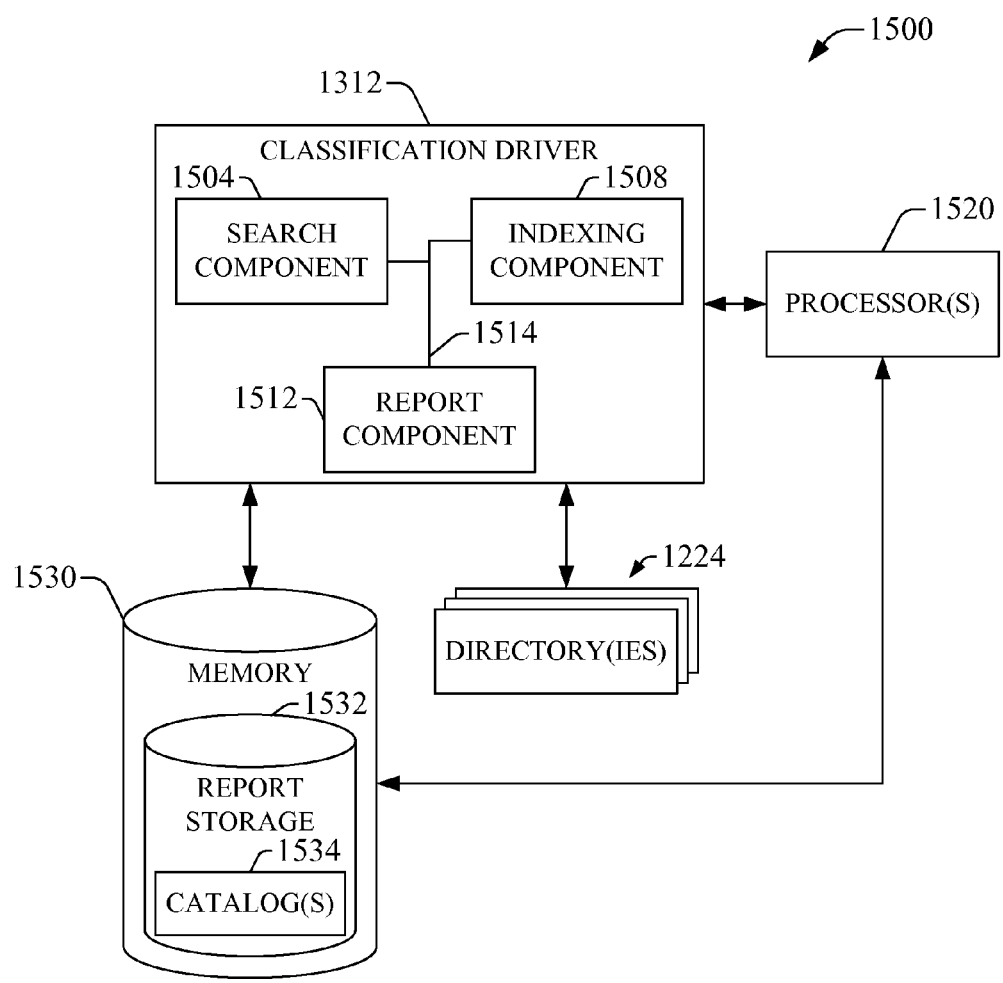
FIG. 15 is an example embodiment of a component that enables to search and index at least one interface component or at least one layer within an industrial environment in accordance with aspects of the subject disclosure.

In example embodiment 1300, classification driver 1312 can search for a specific interface component within in or more layers in the set of layers $710_1$-$710_N$. Such search can be based on a query related to one or more functional features of an interface component. The query can be acquired (received, retrieved, etc.) from a user device or functional element(s) within a layer. In response to acquiring the query, classification driver 1312 can scan one or more layers within the set of layers $710_1$-$710_N$ and, based on information (data, metadata, etc.) collected through the scanning classification driver 1312 can identify at least one interface component that can provide at least one functional feature conveyed in the query. In example embodiment 1500 illustrated in FIG. 15, classification driver 1312 includes a search component 1504 that scans the set of layers in an industrial environment in response to a query that includes one or more functional features of an interface component.

Additionally or alternatively, classification driver 1312 can exploit information collected in a search for an interface component to index data or metadata related to at least one layer in the set of layer $710_1$-$710_N$ and sub-layers therein. In example embodiment 1500, indexing component 1508 can index such data or metadata. Indexing component 1508 can receive or retrieve the data or metadata from search component 1504 via a bus 1514. Bus 1514 can be embodied in at least one of a memory bus, a system bus, an address bus, a message bus, or any other conduit, protocol, or mechanism for data or information exchange among components that execute a process or are part of execution of a process. Bus 1514 also can include a power bus.

Classification driver 1312 can retain data or metadata collected in a search for an interface component within repository 1220. Such data or metadata can be retained within directory(ies) 1224. In addition or in the alternative, the data or metadata can be retained in a disparate memory within repository 1220 or a storage layer within one or more layers in the set of layers $710_1$-$710_N$. As an illustration, in example embodiment 1500, classification driver 1312 includes a report component 1512 that stores data and metadata extracted in a search for an interface component within one or more catalog(s) 1534 in report storage 1532 that is part of a memory 1530 functionally coupled to classification driver 1312. Memory 1530 can be part of repository 1220 or a storage layer (not shown) within one or more of layers $710_1$-$710_N$. In an aspect, report component 1512 can receive the data or metadata from search component 1504 or indexing component 1508 via a bus 1514.

In one or more embodiments, e.g., example embodiment 1600, classification driver 1312 includes a metadata mining component 1604 that can collect metadata related to at least one interface component, at least one functional feature of the interface component, or at least one layer in an industrial environment (e.g., 700). Metadata mining component 1604 can supply metadata to one or more layers of the industrial environment. In an aspect, metadata mining component 1604 can collect metadata as part of a response to a query serviced by classification driver 1312. In addition or in the alternative, in response to a predetermined event, other than a search, metadata mining component 1604 can scan one or more layers of the industrial environment and extract metadata; the predetermined event can include layer deployment, interface component instantiation, system request, scheduled maintenance of one or more layers, or the like.

Figure 16:
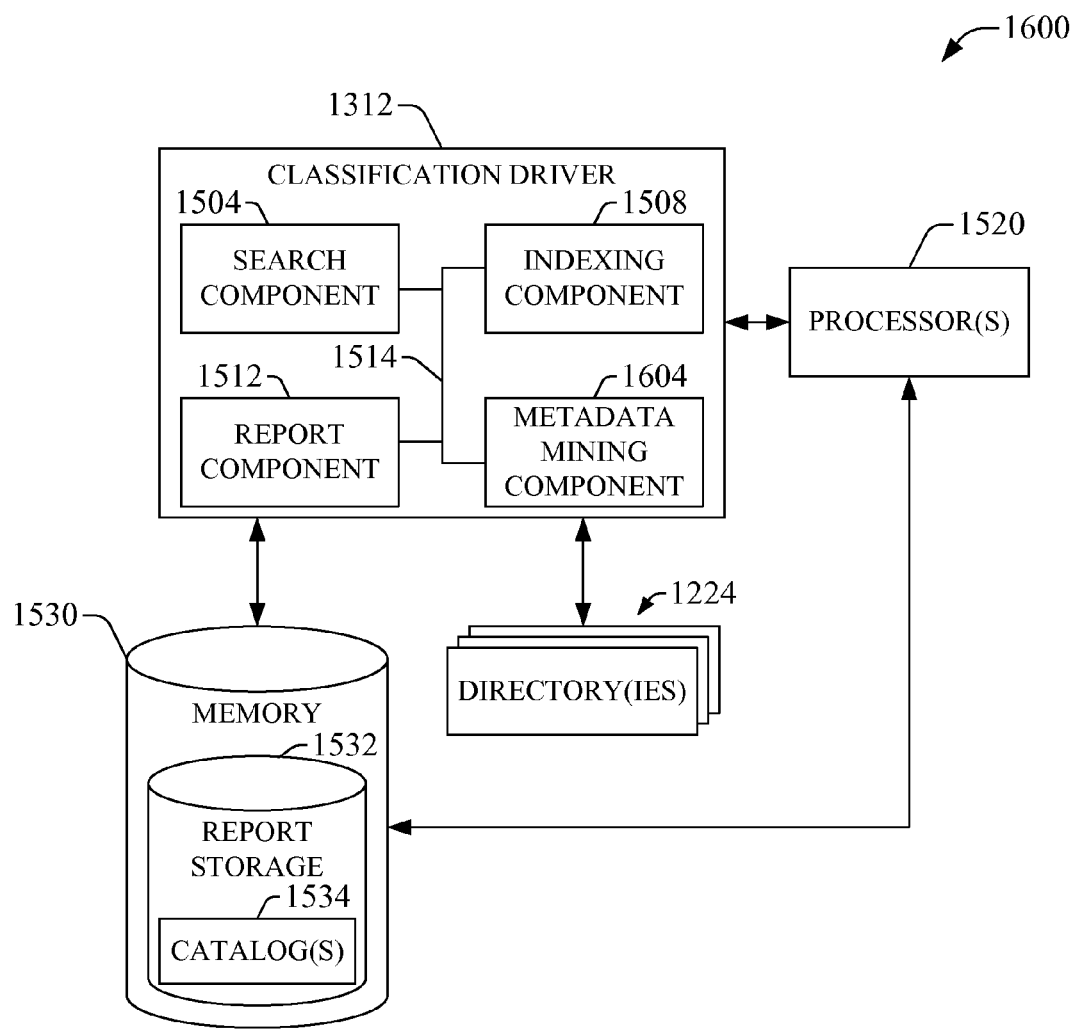
FIG. 16 is an example embodiment of a component that enables to supply metadata related to one or more of an interface component or a layer in accordance with aspects described herein.

In example embodiments 1500 and 1600, processor(s) 1520 can be part of admin host 1210 which includes utility component(s) 1214 of which classification driver 1312 can be a part of as described supra. Processor(s) 1520 can be configured to execute or can execute computer-executable instructions (not shown) stored in a memory to implement or provide at least part of the described functionality of classification driver 1312. In the illustrated example embodiment, such memory is memory 1530. In additional or alternative embodiments, the memory can be memory 1220 (not shown in FIGS. 15-16). As described supra, such computer-executable instructions can include program modules or software or firmware applications that implement specific tasks which can be accomplished, for example, through one or more of the methods described in the subject specification and that are associated, at least in part, with functionality or operation of example system 1200. In one or more embodiments, classification driver 1312 and components therein can be can be implemented as software or firmware that can be retained in memory 1530 as one or more sets of computer-executable instructions that, when executed by processor(s) 1520, implement such components and their associated functionality as described herein in various aspects. It is noted that a memory that is functionally coupled (e.g., communicatively coupled) to processor(s) 1520 also can retain the one or more sets of computer-executable instructions that embody classification driver 1312 and components therein. To provide such functionality, in one aspect, processor(s) 1520 can exploit a bus to functionally couple to classification driver 1312 and memory 1530, and exchange data or any other information amongst classification driver 1308, components therein, and memory 1530 or memory elements therein. The exchanged information can include at least one of computer-executable instruction(s), computer-executable code structure(s), data structures, or the like.

Integrity driver 1316 can test and diagnose a layer $710_K$. Integrity driver 1316 also can troubleshoot issue(s) identified while testing and diagnosing the layer $710_K$.

In view of the example systems and related embodiments described supra, example methods that can be implemented in accordance with the disclosed subject matter can be better appreciated with reference to flowcharts in FIGS. 17-20. For purposes of simplicity of explanation, various methods disclosed herein are presented and described as a series of acts; however, it is to be understood and appreciated that the subject disclosure is not limited by the order of acts, as some acts may occur in different order and/or concurrently with other acts from that shown and described herein. It is noted that not all illustrated acts may be required to implement a described method in accordance with the subject specification. In addition, for example, one or more methods disclosed herein could alternatively be represented as a series of interrelated states or events, such as in a state diagram. Moreover, interaction diagram(s) or call flow(s) represent several of the example methods disclosed herein in accordance with the described subject matter; particularly in instances when disparate entities, or functional elements, enact disparate portions of one or more of the several methods. Furthermore, two or more of the disclosed example methods can be implemented in combination, to accomplish one or more features or advantages described in the subject disclosure.

Figure 17:
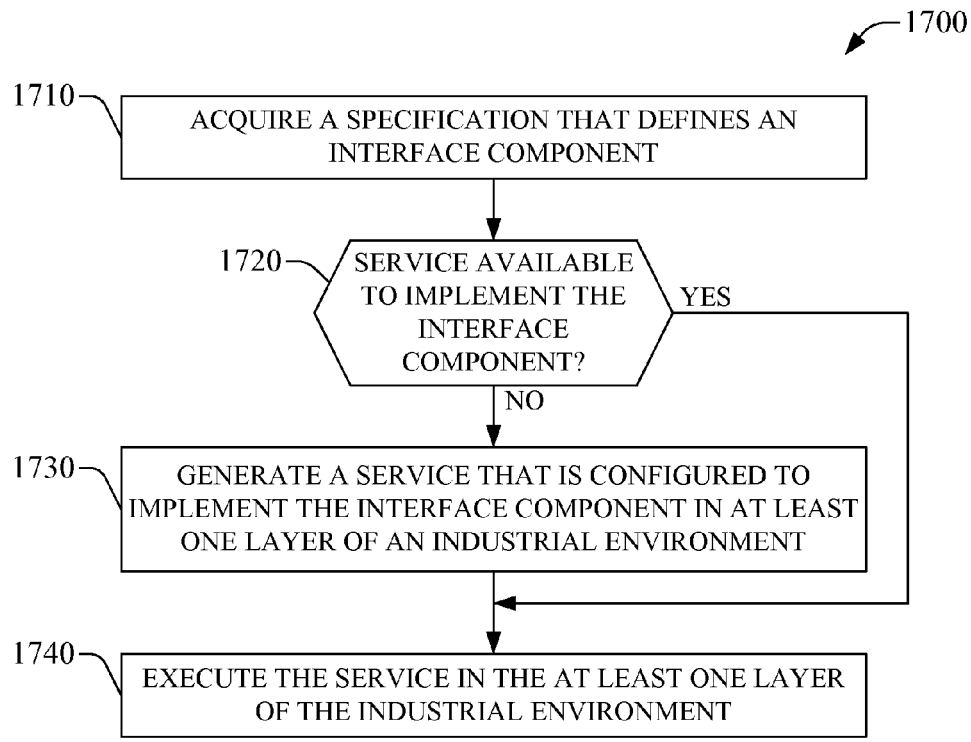
FIG. 17 presents an example method for applying or implementing an interface component in an industrial environment according to aspects of the subject disclosure.

FIG. 17 presents a flowchart of an example method 1700 for applying or implementing an interface component in an industrial environment according to aspects of the subject disclosure. In an aspect, an implementation platform, such as implementation platform 914, or one or more components therein, can enact (e.g., execute) the subject example method 1700. In another aspect, one or more processor(s) can implement (e.g., execute) or enable a computing device (a host, equipment, a terminal, a controller, etc.) to implement the subject example method. In certain embodiments, the one or more processors can be configured to provide or provide functionality of the implementation platform. In alternative or additional embodiments, the computing device can be part of a layer, as described herein. At act 1710, a specification that defines an interface component is acquired. In an aspect, the specification can be acquired from a design environment. In particular, though not exclusively, the specification can be received from a host (e.g., a hardware server or software server) in a CAD layer (e.g., CAD layer 1150). At act 1720, it is determined if a service is available to implement the interface component. As described supra, implementing the interface component can result in enabling the interface component. In the negative case, at act 1730, a service is generated, wherein the service is configured to implement the interface component in at least one layer (e.g., an equipment layer such as MES layer 1130) of an industrial environment. At act 1740, the service is executed in the at least one layer of the industrial environment. In case outcome of act 1720 is affirmative, flow is directed to act 1740.

Figure 18:
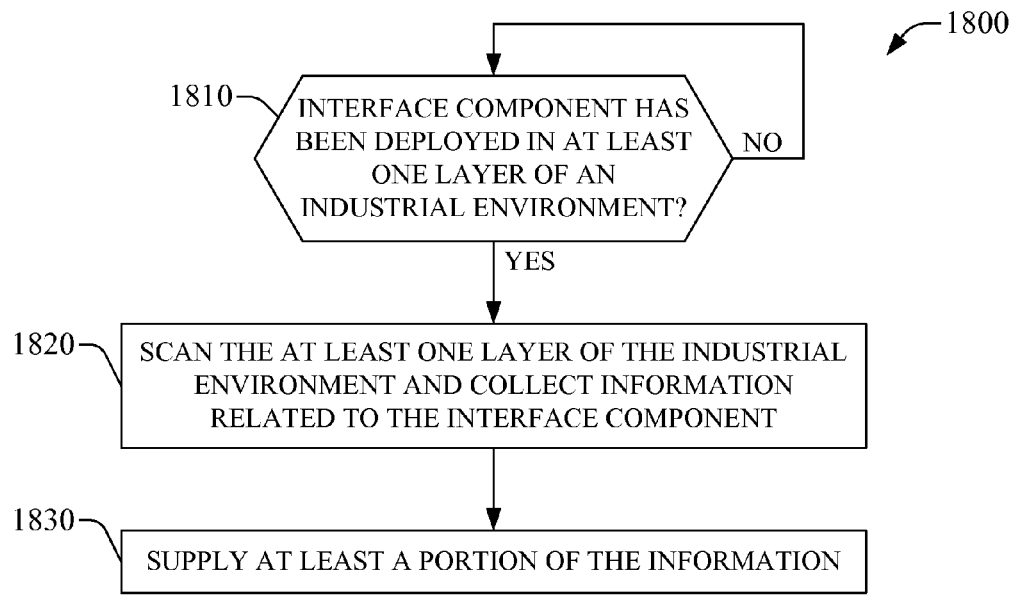
FIG. 18 presents an example method for discovering an interface component in an industrial environment according to aspects of the subject disclosure.

FIG. 18 presents a flowchart of an example method 1800 for discovering an interface component within at least one layer in an industrial environment according to aspects of the subject disclosure. At act 1810, it is determined if an interface component has been deployed (e.g., provisioned or activated) in at least one layer of an industrial environment. In case of a negative outcome to such determination, act 1810 is re-enacted. Re-enacting act 1810 can be dictated by the manner in which it is determined whether the interface component has been deployed. As an example, if the determination in act 1810 is made periodically with a period $\tau$, act 1810 can be re-enacted at a rate $\tau^{-1}$. As another example, if the determination in act is effected according to a schedule, act 1810 is re-enacted at predetermined intervals established by the schedule. In the affirmative case, at act 1820, the at least one layer of the industrial environment is scanned and information related to the interface component is collected. At act 1830, at least a portion of the information is supplied.

Figure 19:
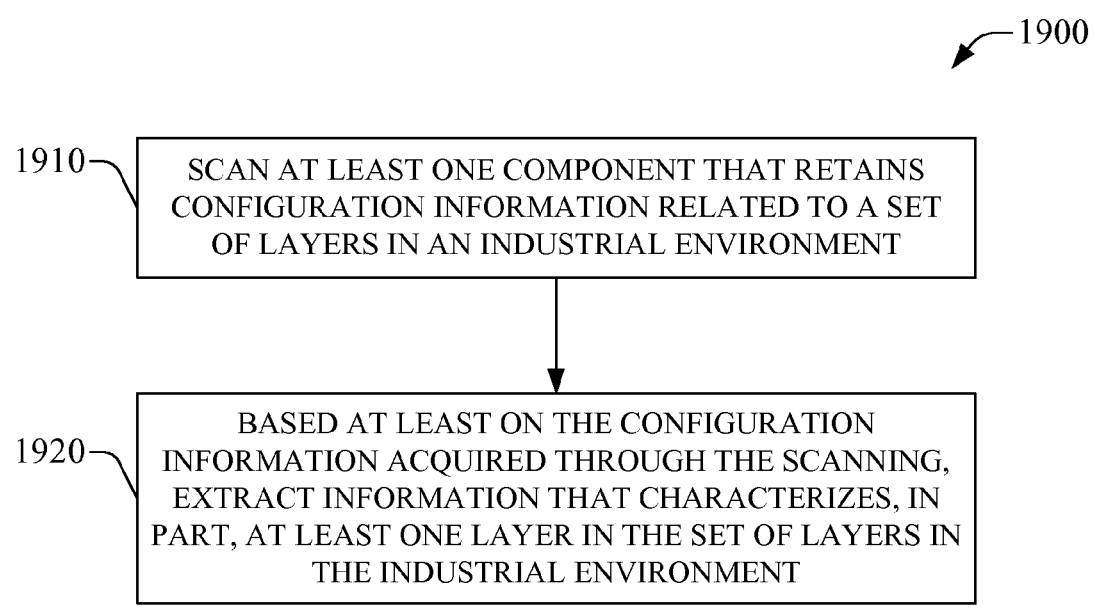
FIG. 19 illustrates an example method for discovering a layer within an industrial environment according to aspects of the subject disclosure.

FIG. 19 illustrates a flowchart of an example method 1900 for discovering a layer within an industrial environment according to aspects of the subject disclosure. At act 1910, at least one component that retains configuration information related to a set of layers of an industrial environment is scanned. At act 1920, based at least on the configuration information acquired through the scanning at act 1910, information that characterizes at least one layer in the set of layers of the industrial environment is extracted. The information can include metadata and can characterize the at least one layer completely or partially. For instance, the information can include naming instances of functional elements within the at least one layer, logical address(es) for such functional elements, and so forth.

Figure 20:
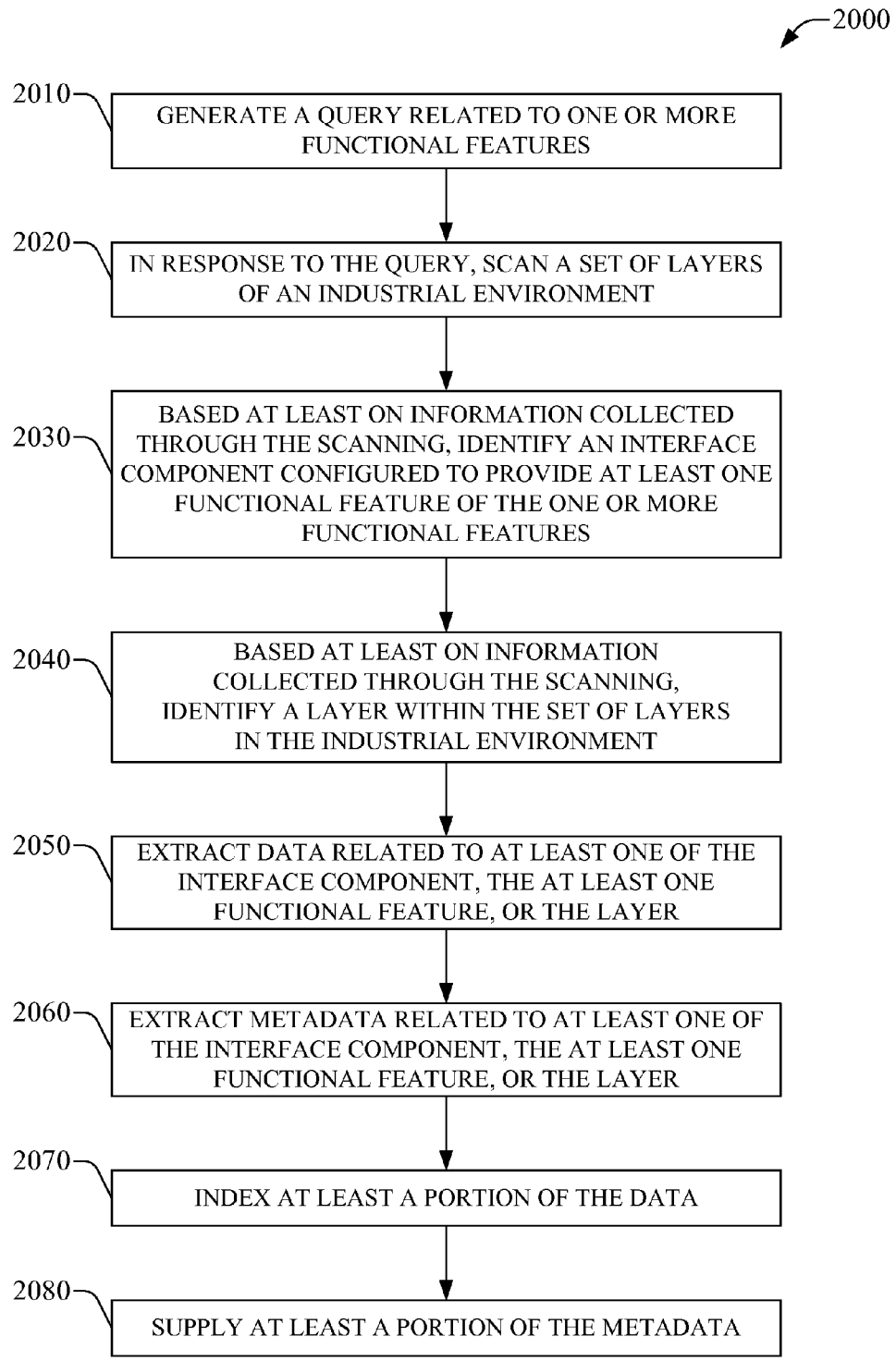
FIG. 20 illustrates an example method for searching and indexing functional interface component(s) or layer(s), or functional features thereof, according to aspects disclosed herein.

FIG. 20 is a flowchart of an example method 2000 for searching and indexing functional interface component(s) or layer(s), or functional features thereof, according to aspects disclosed herein. While searching features illustrated in the subject example method are illustrated with a query related to functional feature(s) of an interface component or a layer, in additional or alternative embodiments, the subject example method 2000 also can be effected via a query related to at least on one or more of a functionality criterion, a version of the interface component, a security criterion, a location criterion, a service profile criterion, or the like. At act 2010, a query related to one or more functional features is generated. At act 2020, in response to the query, a set of layers (e.g., layers $710_1$-$710_N$) of an industrial environment is scanned. At act 2030, based at least on information collected through the scanning act 2020, an interface component is identified, wherein the interface component is configured to provide at least one functional feature of the one or more functional features. At act 2040, based at least on information collected through the scanning act 2020, a layer within the set of layers of the industrial environment is identified. At act 2050, data related to at least one of the interface component, the at least one functional feature, or the layer, is extracted. At act 2060, metadata related to at least one of the interface component, the at least one functional feature, or the layer, is extracted. At act 2070, at least a portion of the data is indexed. At act 2080, at least a portion of the metadata is supplied.

In an aspect, a utility component (e.g., discovery driver 1308, classification driver 1304 . . . ), or one or more components therein, can implement (e.g., execute) the subject example methods 1700-1900. In another aspect, one or more processor(s) can implement (e.g., execute) or enable a computing device (a host, equipment, a terminal, a controller, etc.) to implement the subject example methods 1700-1900. In certain embodiments, the one or more processors can be configured to provide or provide functionality of the utility component. In alternative or additional embodiments, the computing device can be a host (e.g., admin host 1210), as described herein.

Methods disclosed throughout the subject specification and annexed drawings are capable of being stored on an article of manufacture (a removable volatile memory, a removable non-volatile memory, a non-removable volatile memory, a non-removable non-volatile memory, etc.) to enable transporting and transferring such methods to computers for execution, and thus implementation, by a processor or for storage in a memory. In an aspect, one or more processors, such as processor(s) that can enact the one or more methods described herein, can be employed to execute computer-executable code instructions retained in a memory (volatile or non-volatile) or any computer-readable or machine-readable storage medium, in order to implement one or more of the methods described herein. Such computer-executable code instructions provide a computer-executable or machine-executable framework to enact the various methods described herein. In the subject disclosure, computer-executable code instructions are also referred to as computer-executable instructions.

Figure 21:
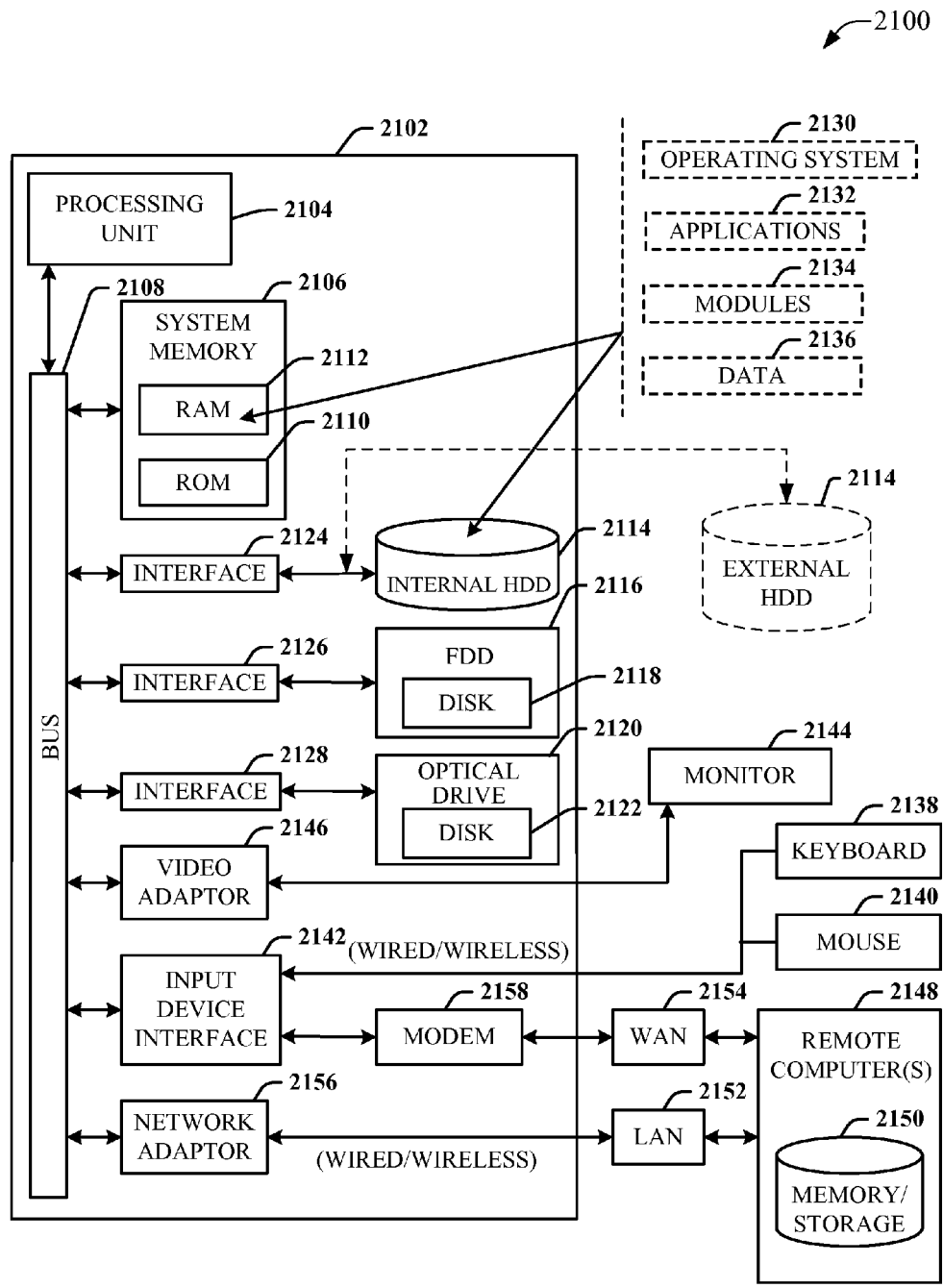
FIG. 21 illustrates a block diagram of a computer configured to execute the aspects disclosed herein.

Referring now to FIG. 21, there is illustrated a block diagram of a computer configured to execute the disclosed architecture. In order to provide additional context for various aspects thereof, FIG. 21 and the following discussion are intended to provide a brief, general description of a suitable computing environment 2100 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 21, the example environment 2100 for implementing various aspects includes a computer 2102, the computer 2102 including a processing unit 2104, a system memory 2106 and a system bus 2108. The system bus 2108 couples system components including, but not limited to, the system memory 2106 to the processing unit 2104. The processing unit 2104 can be any of various commercially available processors. Dual microprocessors and other multiprocessor architectures may also be employed as the processing unit 2104.

The system bus 2108 can be any of several types of bus structure that may further interconnect to a memory bus (with or without a memory controller), a peripheral bus, and a local bus using any of a variety of commercially available bus architectures. The system memory 2106 includes read-only memory (ROM) 2110 and random access memory (RAM) 2112. A basic input/output system (BIOS) is stored in a non-volatile memory 2110 such as ROM, EPROM, EEPROM, which BIOS contains the basic routines that help to transfer information between elements within the computer 2102, such as during start-up. The RAM 2112 can also include a high-speed RAM such as static RAM for caching data.

The computer 2102 further includes an internal hard disk drive (HDD) 2114 (e.g., EIDE, SATA), which internal hard disk drive 2114 may also be configured for external use in a suitable chassis (not shown), a magnetic floppy disk drive (FDD) 2116, (e.g., to read from or write to a removable diskette 2118) and an optical disk drive 2120, (e.g., reading a CD-ROM disk 2122 or, to read from or write to other high capacity optical media such as the DVD). The hard disk drive 2114, magnetic disk drive 2116 and optical disk drive 2120 can be connected to the system bus 2108 by a hard disk drive interface 2124, a magnetic disk drive interface 2126 and an optical drive interface 2128, respectively. The interface 2124 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 2102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the disclosed innovation.

A number of program modules can be stored in the drives and RAM 2112, including an operating system 2130, one or more application programs 2132, other program modules 2134 and program data 2136. All or portions of the operating system, applications, modules, and/or data can also be cached in the RAM 2112. It is to be appreciated that the innovation can be implemented with various commercially available operating systems or combinations of operating systems.

A user can enter commands and information into the computer 2102 through one or more wired/wireless input devices, e.g., a keyboard 2138 and a pointing device, such as a mouse 2140. Other input devices (not shown) may include a microphone, an IR remote control, a joystick, a game pad, a stylus pen, touch screen, or the like. These and other input devices are often connected to the processing unit 2104 through an input device interface 2142 that is coupled to the system bus 2108, but can be connected by other interfaces, such as a parallel port, an IEEE 1394 serial port, a game port, a USB port, an IR interface, etc.

A monitor 2144 or other type of display device is also connected to the system bus 2108 via an interface, such as a video adapter 2146. In addition to the monitor 2144, a computer typically includes other peripheral output devices (not shown), such as speakers, printers, etc.

The computer 2102 may operate in a networked environment using logical connections via wired and/or wireless communications to one or more remote computers, such as a remote computer(s) 2148. The remote computer(s) 2148 can be a workstation, a server computer, a router, a personal computer, portable computer, microprocessor-based entertainment appliance, a peer device or other common network node, and typically includes many or all of the elements described relative to the computer 2102, although, for purposes of brevity, only a memory/storage device 2150 is illustrated. The logical connections depicted include wired/wireless connectivity to a local area network (LAN) 2152 and/or larger networks, e.g., a wide area network (WAN) 2154. Such LAN and WAN networking environments are commonplace in offices and companies, and facilitate enterprise-wide computer networks, such as intranets, all of which may connect to a global communications network, e.g., the Internet.

When used in a LAN networking environment, the computer 2102 is connected to the local network 2152 through a wired and/or wireless communication network interface or adapter 2156. The adaptor 2156 may facilitate wired or wireless communication to the LAN 2152, which may also include a wireless access point disposed thereon for communicating with the wireless adaptor 2156.

When used in a WAN networking environment, the computer 2102 can include a modem 2158, or is connected to a communications server on the WAN 2154, or has other means for establishing communications over the WAN 2154, such as by way of the Internet. The modem 2158, which can be internal or external and a wired or wireless device, is connected to the system bus 2108 via the serial port interface 2142. In a networked environment, program modules depicted relative to the computer 2102, or portions thereof, can be stored in the remote memory/storage device 2150. It will be appreciated that the network connections shown are example and other means of establishing a communications link between the computers can be used.

The computer 2102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 22:
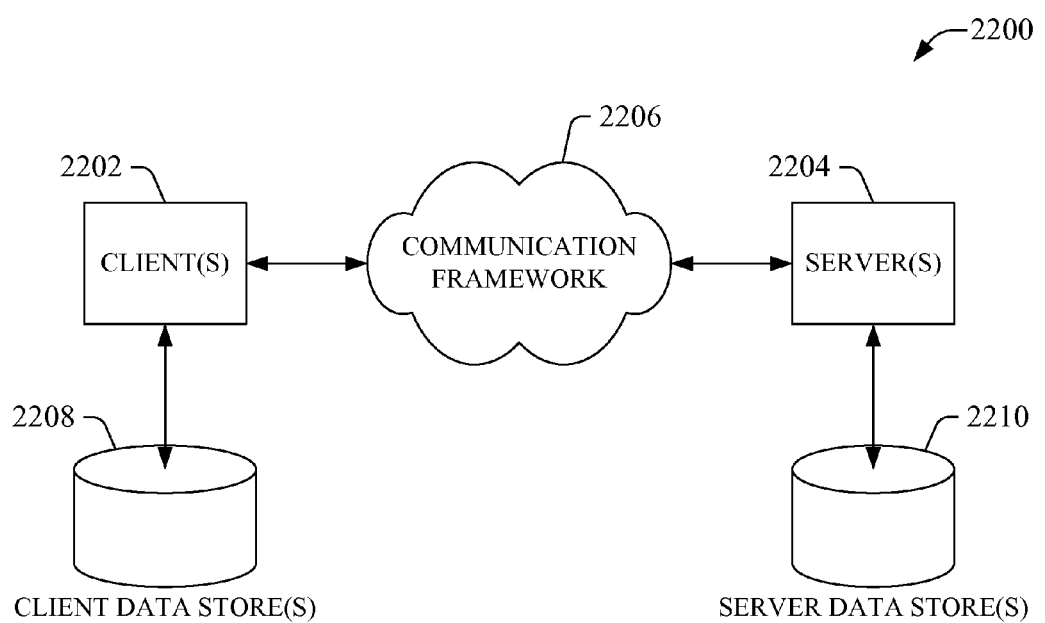
FIG. 22 illustrates a schematic block diagram of an example computing environment according to aspects of the subject disclosure.

Referring now to FIG. 22, there is illustrated a schematic block diagram of an example computing environment 2200 in accordance with another aspect. The system 2200 includes one or more client(s) 2202. The client(s) 2202 can be hardware and/or software (e.g., threads, processes, computing devices). The client(s) 2202 can house cookie(s) and/or associated contextual information by employing the subject innovation, for example.

The system 2200 also includes one or more server(s) 2204. The server(s) 2204 can also be hardware and/or software (e.g., threads, processes, computing devices). The servers 2204 can house threads to perform transformations by employing the invention, for example. One possible communication between a client 2202 and a server 2204 can be in the form of a data packet adapted to be transmitted between two or more computer processes. The data packet may include a cookie and/or associated contextual information, for example. The system 2200 includes a communication framework 2206 (e.g., a global communication network such as the Internet) that can be employed to facilitate communications between the client(s) 2202 and the server(s) 2204.

Communications can be facilitated via a wired (including optical fiber) and/or wireless technology. The client(s) 2202 are operatively connected to one or more client data store(s) 2208 that can be employed to store information local to the client(s) 2202 (e.g., cookie(s) and/or associated contextual information). Similarly, the server(s) 2204 are operatively connected to one or more server data store(s) 2210 that can be employed to store information local to the servers 2204.

In the subject specification and annexed drawings, terms such as "store," "data store," data storage," "repository," and substantially any term(s) that convey other information storage component(s) relevant to operation and functionality of a functional element or component described herein, refer to "memory components," or entities embodied in a "memory" or components comprising the memory. The memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of further illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An example storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   at least one memory communicatively coupled to the at least one processor, the at least one memory having stored therein computer-executable instructions comprising:
      an acquisition component that acquires a specification that defines an interface component;
      a code generator component that composes a service automatically based on the specification, the service is configured to implement at least one functional feature of the interface component in a set of layers of an industrial environment; and
      a matching component that:
         observes a plurality of host devices operating in the set of layers of the industrial environment to determine whether at least one host device meets an operational requirement of the service;
         in response to determining that the at least one host device meets the operational requirement of the service, binds the at least one host device to the service; and
         in response to determining that none of the plurality of host devices meet the operational requirement of the service:
            periodically observes the set of layers to determine whether a new host device has been added to the set of layers that meets the operational requirement of the service or at least one of the plurality of host devices has been modified to meet the operational requirement of the service;
            in response to determining that the new host device has been added to the set of layers that meets the operational requirement of the service to meet the operational requirement of the service, binds the new host device to the service; and
            in response to determining that at least one of the plurality of host devices has been modified to meet the operational requirement of the service, binds the at least one modified host device to the service.

2. The system of claim 1, wherein the code generator component, in response to composing the service, signals the plurality of host devices that the service is available.

3. The system of claim 1, further comprising a discovery driver component that locates at least one interface component in the set of layers based upon a discovery criteria.

4. The system of claim 3, wherein the discovery driver component is automatically triggered to locate the at least one interface component based on a condition in the industrial environment.

5. The system of claim 1, further comprising a discovery driver component that locates a plurality of interface components in the set of layers and generates a plan of the plurality of interface components within the set of layers.

6. A method, comprising:
   acquiring, by a device including a processor, a specification that defines an interface component;
   based on the specification, generating, by the device, a service that is configured to implement the interface component in at least one layer of a set of layers of an industrial environment;
   monitoring, by the device, a plurality of host devices operating in the set of layers of the industrial environment to determine whether at least one host device meets an operational requirement of the service;
   in response to determining that the at least one host device meets the operational requirement of the service, binds the at least one host device to the service; and
   in response to determining that none of the plurality of host devices meet the operational requirement of the service:
      periodically observing the set of layers to determine whether a new host device has been added to the set of layers that meets the operational requirement of the service or at least one of the plurality of host devices has been modified to meet the operational requirement of the service;
      in response to determining that the new host device has been added to the set of layers that meets the operational requirement of the service to meet the operational requirement of the service, binds the new host device to the service; and
      in response to determining that at least one of the plurality of host devices has been modified to meet the operational requirement of the service, binds the at least one modified host device to the service.

7. The method of claim 6, further comprising:
   in response to generating the service, signaling, by the device, the plurality of host devices that the service is available.

8. The method of claim 6, further comprising locating, by the device, at least one interface component in the set of layers based upon a discovery criteria.

9. The method of claim 8, wherein the locating is automatically triggered based on a condition in the industrial environment.

10. The method of claim 6, further comprising:
identifying, by the device, a plurality of interface components in the set of layers; and
producing a plan of the plurality of interface components within the set of.

11. A non-transitory computer-readable medium having instructions stored thereon that, in response to execution, cause a system including a processor to perform operations comprising:
accessing a specification that defines an interface component;
creating a service, based on the specification, that is configured to implement the interface component in at least one layer of a set of layers of an industrial environment;
monitoring a plurality of host devices operating in the set of layers of the industrial environment to determine whether at least one host device meets an operational requirement of the service;
in response to determining that the at least one host device meets the operational requirement of the service, binds the at least one host device to the service; and
in response to determining that none of the plurality of host devices meet the operational requirement of the service:
periodically observing the set of layers to determine whether a new host device has been added to the set of layers that meets the operational requirement of the service or at least one of the plurality of host devices has been modified to meet the operational requirement of the service;
in response to determining that the new host device has been added to the set of layers that meets the operational requirement of the service to meet the operational requirement of the service, binds the new host device to the service; and
in response to determining that at least one of the plurality of host devices has been modified to meet the operational requirement of the service, binds the at least one modified host device to the service.

12. The non-transitory computer-readable medium of claim 11, the operations further comprising:
in response to generating the service, signaling, by the device, the plurality of host devices that the service is available.

13. The non-transitory computer-readable medium of claim 11, the operations further comprising locating, by the device, at least one interface component in the set of layers based upon a discovery criteria.

14. The non-transitory computer-readable medium of claim 13, wherein the locating is automatically triggered based on a condition in the industrial environment.

15. The non-transitory computer-readable medium of claim 11, the operations further comprising:
identifying, by the device, a plurality of interface components in the set of layers; and
producing a plan of the plurality of interface components within the set of layers.

* * * * *